Nov. 16, 1965  J. D. HUGHSON  3,217,663
STRAIN GAUGE CONTROL FOR SLAVE LOCOMOTIVE
Filed Nov. 13, 1963  8 Sheets-Sheet 1
FIG. IA.
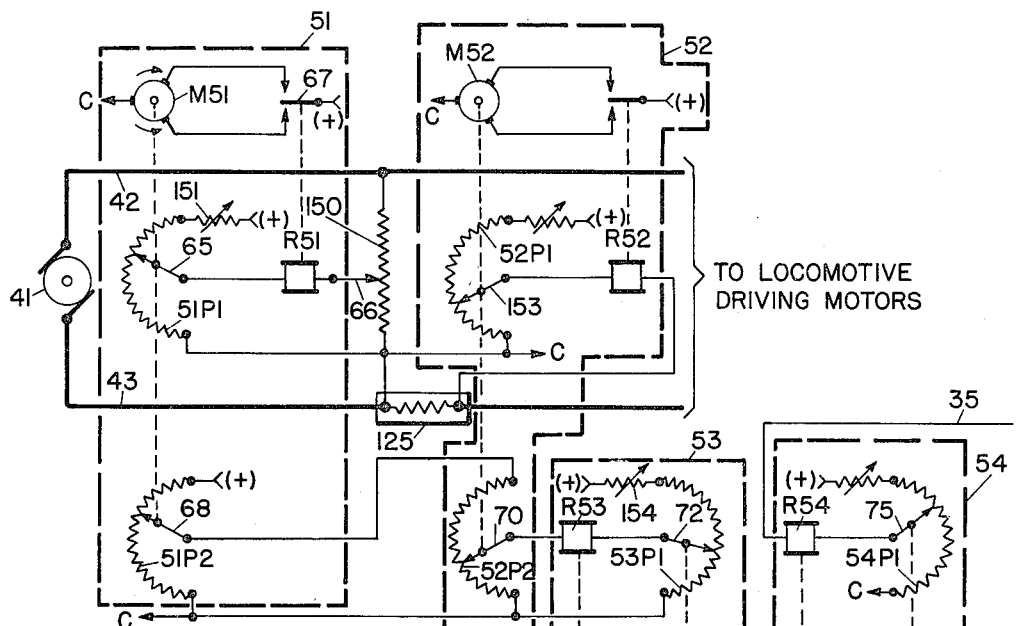
FIG. 5.
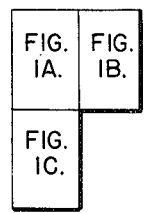
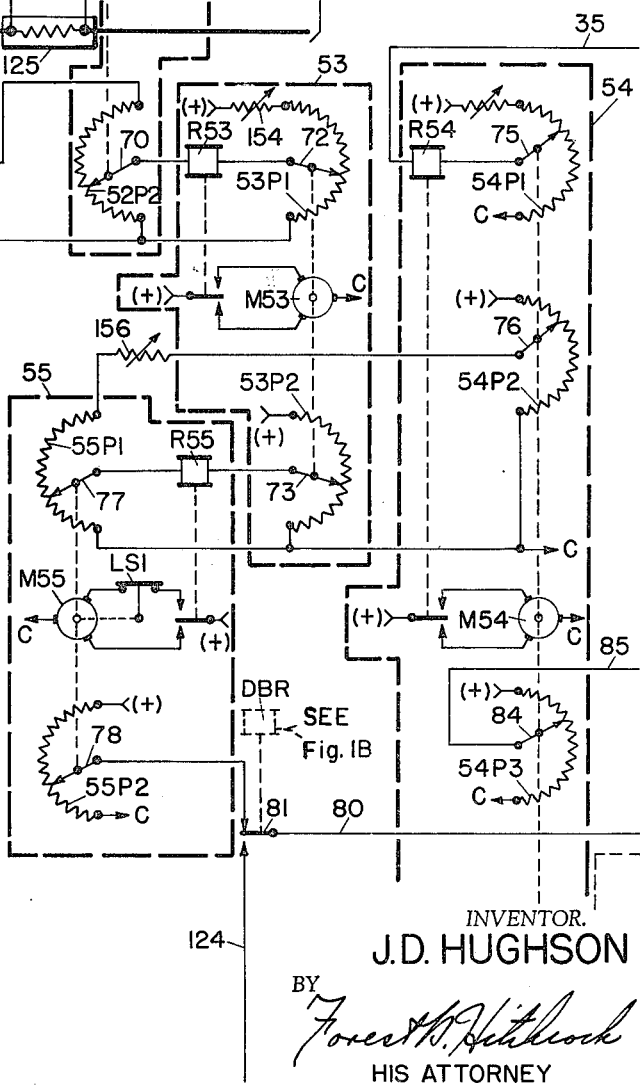
INVENTOR.
J.D. HUGHSON
BY
*Forest W. Hitchcock*
HIS ATTORNEY Nov. 16, 1965   J. D. HUGHSON   3,217,663
STRAIN GAUGE CONTROL FOR SLAVE LOCOMOTIVE
Filed Nov. 13, 1963   8 Sheets-Sheet 2
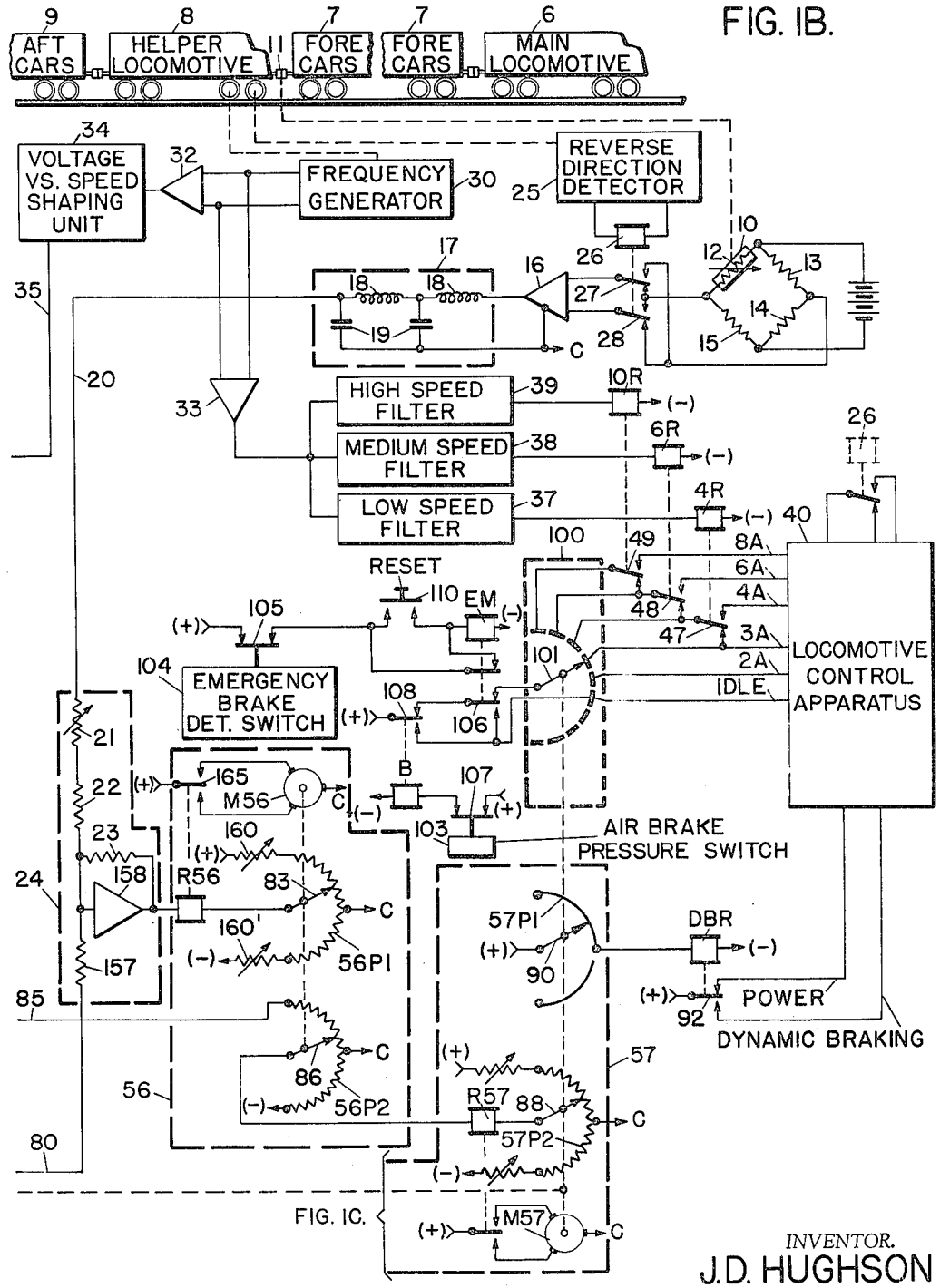
FIG. IB.
INVENTOR.
J.D. HUGHSON
BY
HIS ATTORNEY

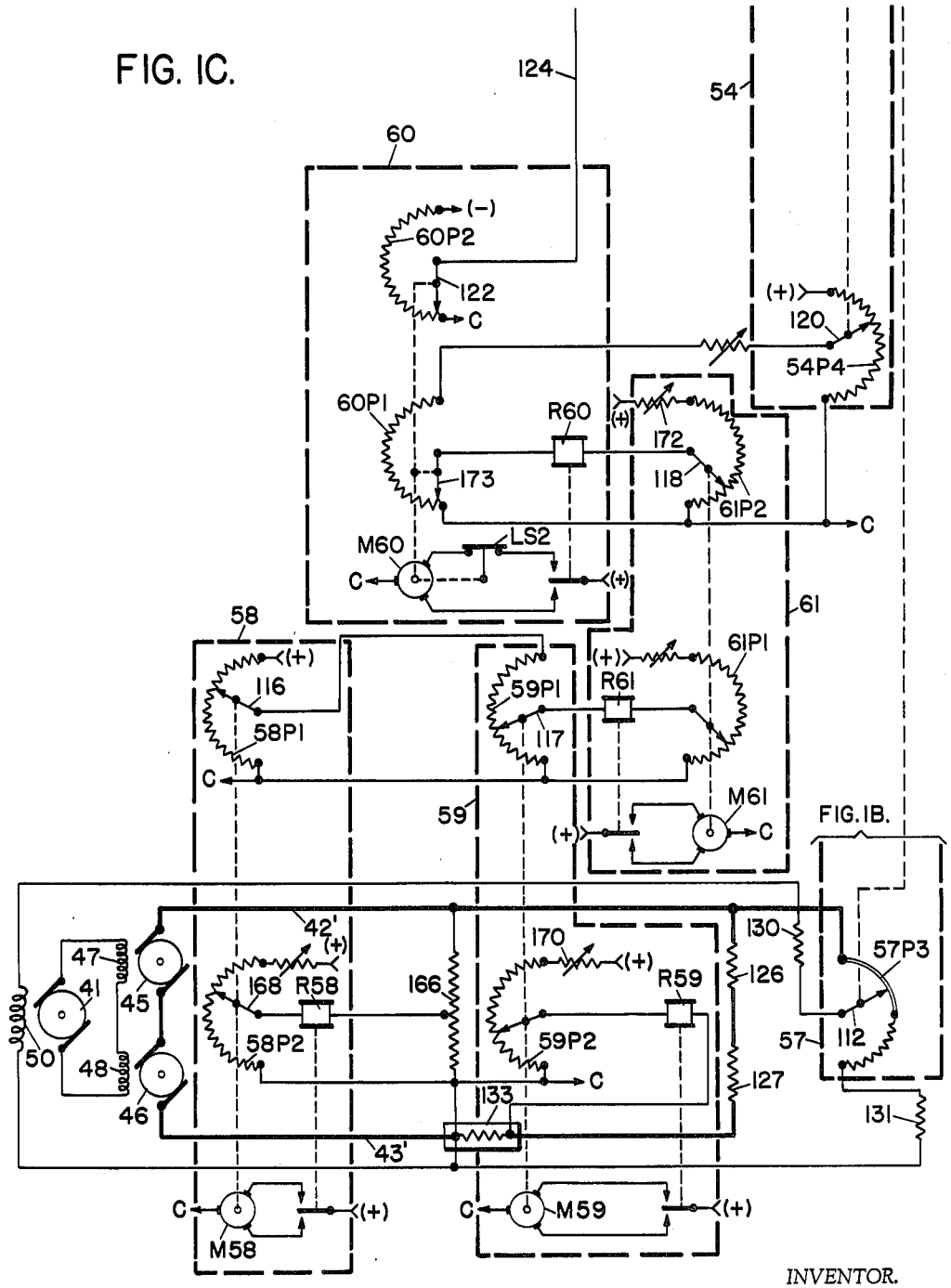

| WIRE DESIGNATION | THROTTLE SETTING |
|---|---|
| 8A | FAST |
| 6A | MEDIUM-FAST |
| 4A | MEDIUM |
| 3A | MEDIUM-SLOW |
| 2A | SLOW |
| IDLE | IDLE |

INVENTOR.
J.D. HUGHSON
BY
HIS ATTORNEY

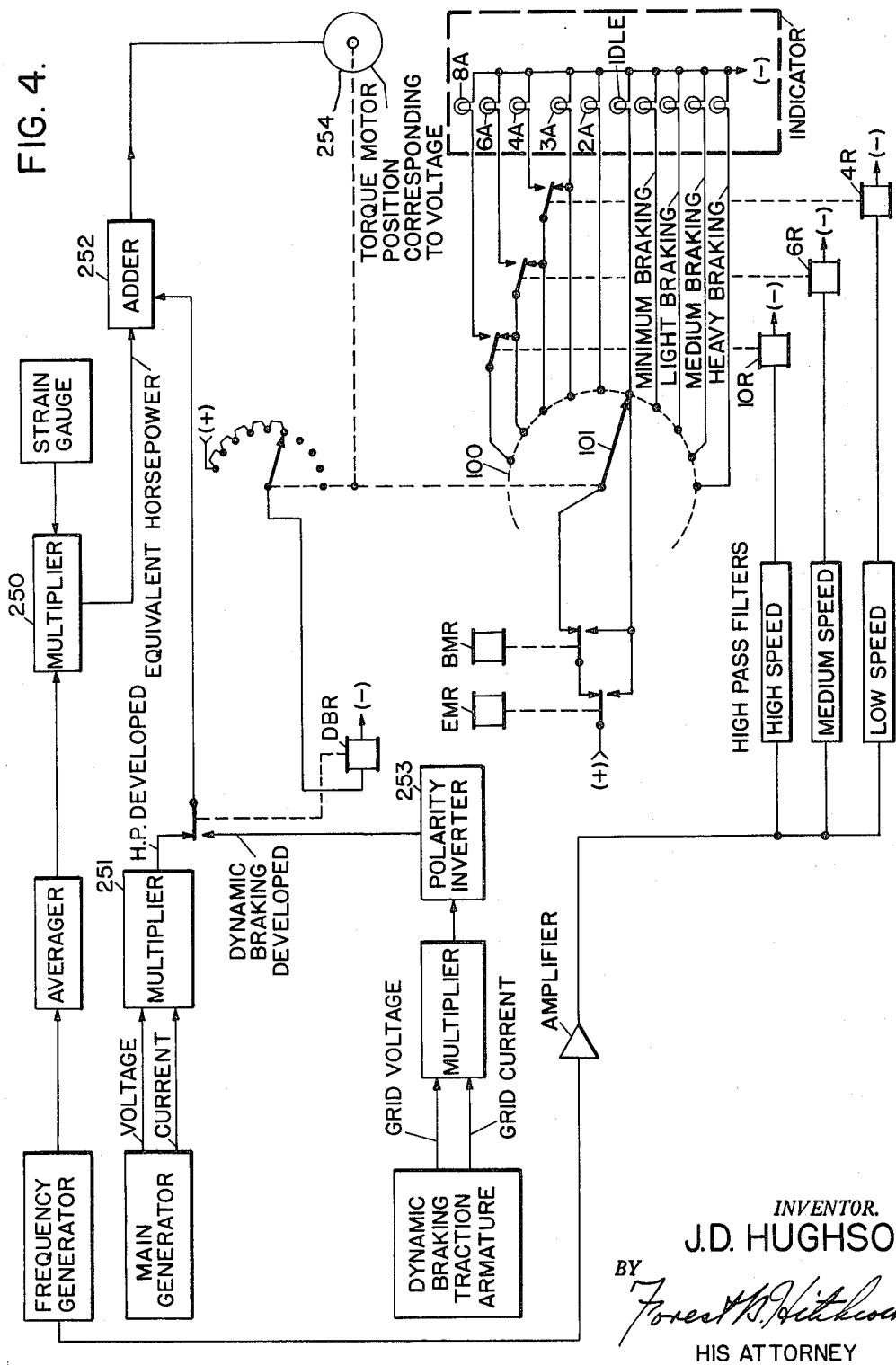

INVENTOR.
J. D. HUGHSON
BY
HIS ATTORNEY

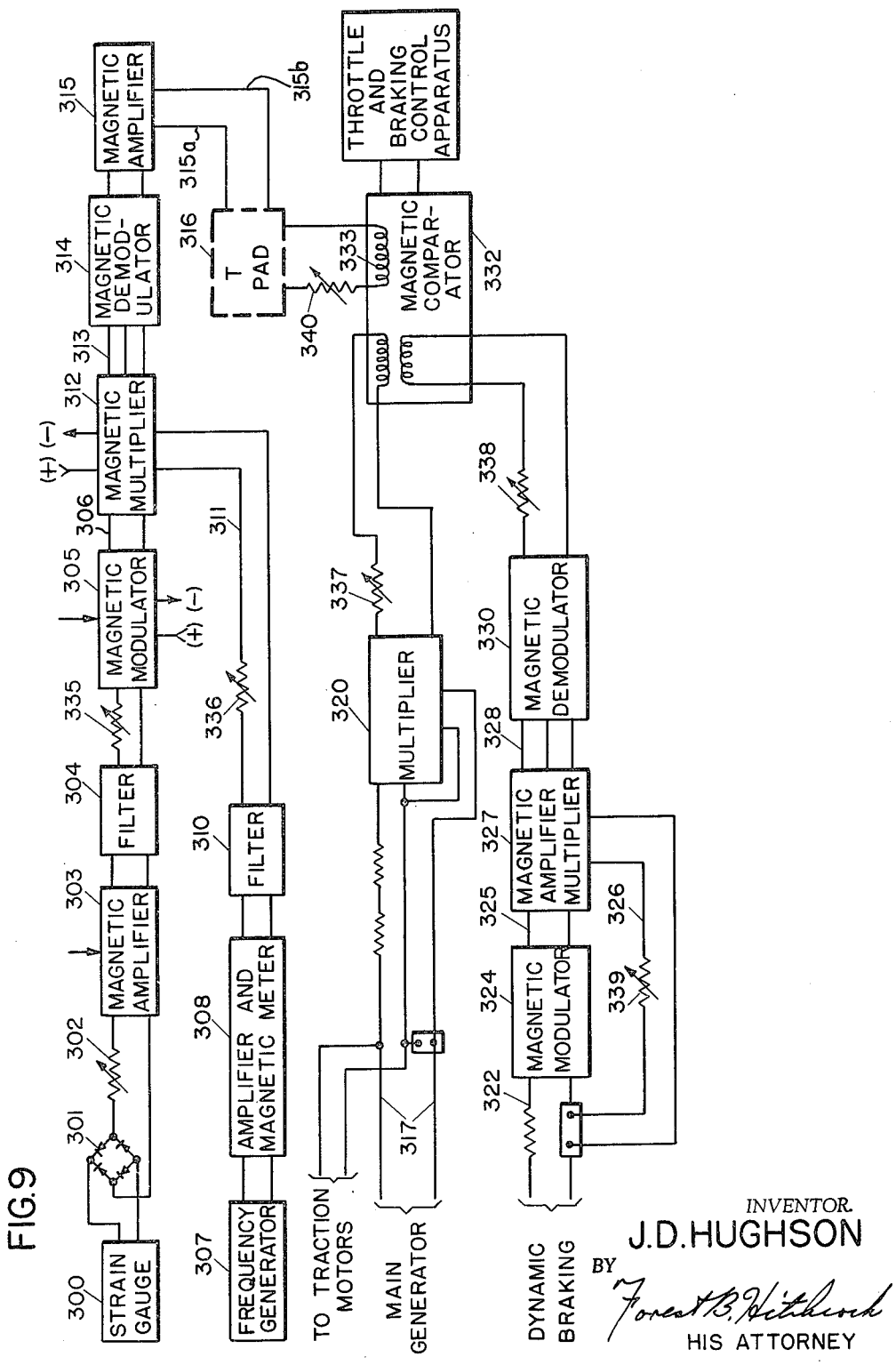

United States Patent Office 3,217,663
Patented Nov. 16, 1965

3,217,663
STRAIN GAUGE CONTROL FOR SLAVE LOCOMOTIVE
J. Donald Hughson, Rochester, N.Y., assignor to General Signal Corporation, Rochester, N.Y., a corporation of New York
Filed Nov. 13, 1963, Ser. No. 324,173
25 Claims. (Cl. 105—1)

This invention relates to a system for controlling a locomotive, and more particularly to a method and apparatus for controlling the operation of a slave or helper locomotive connected within a train of cars with a main or controlling locomotive separated from the slave.

More specifically, the present invention relates to a control system for a helper locomotive which is operated in accordance with either the tensile or compressive stress to which the helper locomotive is subjected at a coupling connection along with its speed and horse power requirements to control the throttle or dynamic brake effectively to provide a proportionate share of the train load with a main or controlling locomotive. This application is a continuation-in-part of application Ser. No. 133,686, filed in the U.S. Patent Office on August 6, 1961, now abandoned.

It is common practice to provide one or more helper locomotive units, which are connected directly behind the main locomotive unit, with each helper unit having its controls connected to the main unit, thereby providing the necessary tractive effort and power for operating a train of cars that is too long, or over terrain which is too irregular to be operated by a single locomotive unit. Although such directly connected multiple locomotive units theoretically have sufficient power to pull a great number of railroad cars, the number of cars that are able to be included practically in such a train is limited by the strength of the draw-bars and couplings on the individual cars. A train having a number of cars in excess of some practical limit generally results in damaged draw-bars, couplings, and not infrequently damage to the frames of individual cars.

Heretofore in an attempt to overcome this practical limit of the length of trains pulled by more than one locomotive, and to more evenly distribute the force exerted on the couplings of the individual cars, it has been proposed to position the helper locomotive in the train remotely from the main locomotive. The operation of the slave locomotive is then controlled from the main locomotive by a communication link, such as a radio frequency link, to in effect constitute a multiple locomotive unit. However, such a system has many disadvantages. For example, it is necessary to install and maintain locomotive control apparatus on both the main and slave locomotives. Also, in a radio frequency system, the communication link is ofttimes unreliable because it may be disrupted by extraneous electrical influences such as lightning discharges or other conflicting transmitted radio frequencies. Because of impracticability of obtaining an isolated radio frequency for such a system, the prior proposed systems were rendered even less reliable by using the same frequency as that used for voice communication.

One object of this invention is to provide an improved method and system for controlling a slave or helper locomotive which may be connected within a train remote from the controlling locomotive.

Another object of this invention is to provide an improved method and system for operating a helper locomotive which governs the helper locomotive to share a predetermined portion of the entire train load.

Another object of this invention is to provide a method and system for governing the operation of a helper locomotive wherein the amount of force in tension or compression to which the helper locomotive is subjected is a factor in determining the proper control for the helper locomotive.

Another object of this invention is to provide a system of the character described for controlling the operation of a helper locomotive which is effective for both directions of travel.

Another object of this invention is to provide a system for controlling the operation of slave locomotive to share a predetermined portion of the train load in accordance with the amount of tensile or compressive force to which the helper locomotive is subjected which permits the slave locomotive to be displaced from its proportionate share intermediate the ends of a train remote from the main locomotive.

Another object is to provide a method and system of the character described where the combination of torque and speed developed by the helper locomotive is a factor in controlling the helper locomotive.

Another object of this invention is to provide a method and system of the character described wherein a horsepower developed analog on the slave locomotive is combined with an equivalent horsepower analog at a coupling connection to provide the proper control for the slave locomotive.

Another object of the present invention is to provide a method and system of the character described which calculates the horsepower required of the slave locomotive not only under power conditions but dynamic braking as well to provide the proper control for operating the slave locomotive.

Another object is to provide a method and system of the character described for controlling a slave or helper locomotive which does not tend to hunt when the locomotive is subjected to changes of stress.

A still further object is to provide a method and system for controlling a slave or helper locomotive in accordance with the force to which the locomotive is subjected under conditions where the helper locomotive is normally subjected to a pushing or pulling force when it is providing its proportionate share of the train load, for example, such as when the helper locomotive is providing some of the power for pushing cars that are coupled ahead of it, or when the main locomotive is providing some of the power for pulling cars that are coupled behind the helper locomotive, or when the force on the helper locomotive is sensed at the rear coupling.

A still further object of the invention is to provide a system of the character described wherein the force is sensed on the rear coupling and the equivalent horsepower at the rear coupling is multiplied by a train weight ratio in obtaining the proper control for the slave locomotive.

A still further object of the present invention is to provide an improved method and system of the character described which provides for the slave locomotive to assume its proportionate share of the load during acceleration.

Other objects of this invention will become apparent from the drawings, the specification, and the appended claims.

In the drawings:
FIGS. 1A, 1B and 1C when arranged according to the diagram of FIG. 5 show schematically electrical circuitry and apparatus of a system constructed according to one embodiment of this invention;
FIG. 2 shows a table of typical throttle settings for the locomotive when certain designated motor wires of FIG. 1B are individually energized;

FIG. 4 illustrates diagrammatically a system according to another embodiment of the invention using electronic components, and showing it as operating an indicator to inform an operator as to the proper selection of locomotive control;

FIG. 5 shows the arrangement of FIGS. 1A, 1B and 1C;

FIG. 9 illustrates in block diagram a system organization wherein the force is sensed on the rear coupler and employing magnetic amplifiers in the system, by way of example.

Figures 2, 3:
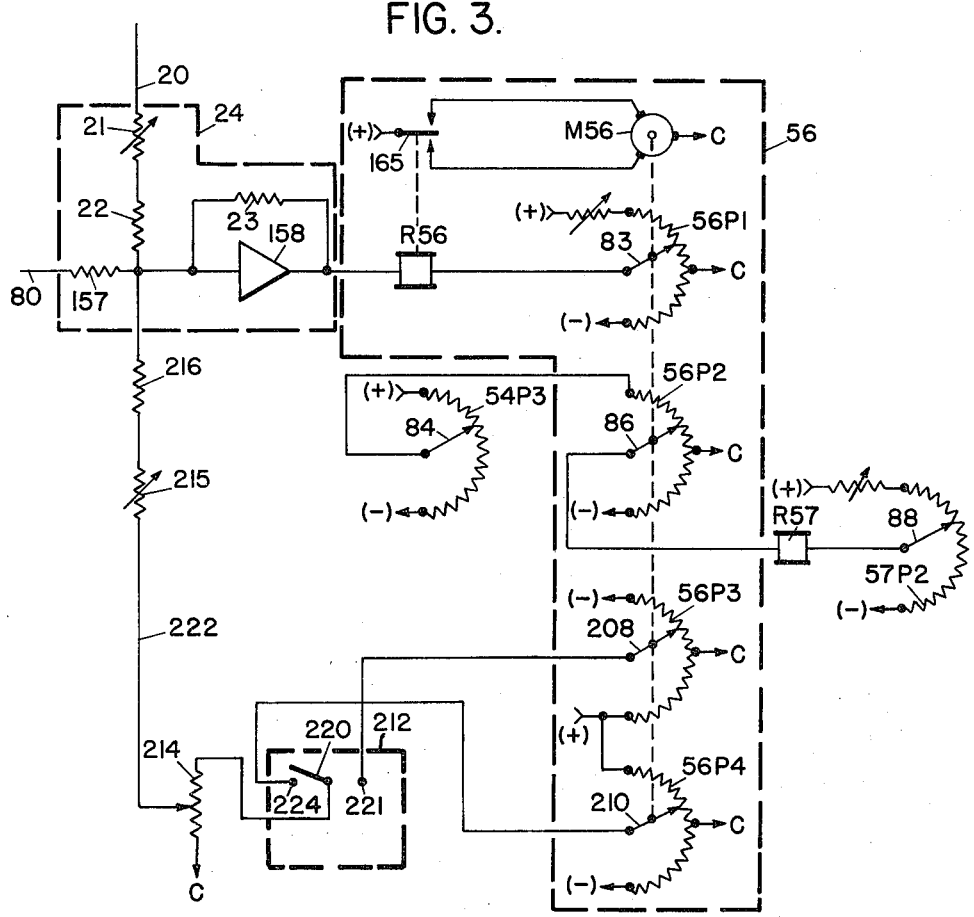
FIG. 3 illustrates schematically additional circuitry for the system of FIGS. 1A, 1B or 1C when normal conditions require either that the helper locomotive be subjected to either tension or compression.

The various parts and circuits in the drawings have been shown diagrammatically and conventional symbols have been used to simplify the illustrations. The drawings are made more for the purpose of facilitating the disclosure as to the principles of the invention and the mode of operation rather than to illustrate the specific construction and arrangement of parts that might be used in practice. The conventional fishtail symbol with a plus sign is used for the positive polarity of a D.C. source of energy. The arrowhead is used with the letter C to denote the common terminal of the battery and with a minus sign to indicate a more negative terminal of the battery throughout the embodiments of this invention.

Generally speaking, and without intending to limit the scope of the present invention, means are provided for producing an analog signal which corresponds to the pushing and pulling type of force exerted against a coupling of the slave locomotive. Means are provided for producing another analog signal which corresponds to the horsepower developed by the slave locomotive, and a third analog signal is provided which corresponds to the velocity of the slave locomotive. These analog signals are combined to provide an analog signal which corresponds to the horsepower required of the slave locomotive to provide its proportionate share of the force necessary to move the train load. The analog signal representative of the horsepower required controls the throttle or dynamic brakes of the slave locomotive as the case may be, which operates the slave locomotive to bring the force on the coupling to the degree or type corresponding to the predetermined portion of the train load for which the slave locomotive is to provide the power. Further, various corrective factors are introduced which modify the analog of the horsepower required of the several embodiments so that the slave locomotive is operated to provide its proportionate share of the power when more or less than its load is coupled behind it and under conditions of acceleration and deceleration.

When using the present invention, a slave or helper locomotive may be coupled at some point within a train remote from the main locomotive in accordance with the individual requirements of practice. The actual position of the slave locomotive in the train may in one instance correspond to the proportional share of the power that this locomotive is to provide. That is, in a train of 100 cars of substantially equal weight, for example, if the slave locomotive has 60% of the train's weight ahead of it, and 40% coupled to the rear, it may be required to provide approximately 40% of the total power for operating the train. In another instance, the slave locomotive may be positioned so that more or less than its proportionate share of the load is coupled behind the locomotive. That is, for example, it may be positioned so that 70% of the train load is ahead of it and 30% behind it; and be governed to provide 50% of the total power, for example. In both instances the control of the slave locomotive in a train is governed by the force measured by a strain gauge mounted, for example, on a coupler of the slave locomotive. The force in tension or compression to which the coupler is subjected when the main locomotive applies a force to a coupler by way of the cars, is sensed and converted into an electrical signal, which corresponds to the amount and type of this force. The character and value of this signal is used in conjunction with other means as hereinafter described for determining the proper control of the helper locomotive.

When all of the slave locomotive's load is coupled to the rear thereof, and the slave locomotive is pulling its proper share of the train load, there is little or no force applied to the forward coupler or draw-bar of the slave locomotive. On the other hand when the slave locomotive is pulling a disproportionate share of the train load, which is less than that required, then there is a tensile force on the front draw-bar of this slave locomotive; and when this disproportionate share is greater than that required, there is a compressive force on the front draw bar, for then the slave locomotive is providing more than its share by tending to push the cars ahead of it. If more or less than its predetermined share of the train load is coupled to the rear some force in either tension or compression is present on the front draw-bar when the helper locomotive is pulling its proportionate share of the train load. Under similar conditions of train operation the force on the rear coupler varies depending on the weight resistance of the portion of the train behind the slave locomotive and the velocity of the slave locomotive. If the slave locomotive is pulling its proper share of the train load the force on the rear coupler is in a correct proportion to the force on the rear coupler is in a correct proportion to the force on the rear coupler of the main or lead locomotive. If it is providing power for a disproportionate share of the load, this force on the rear coupler may be a greater or lesser force in tension or compression than is proper for the correct train weight or resistance ratio. Because this force to which the helper locomotive is subjected both at the front and rear couplers varies depending on the velocity of the train, a force that would be proper for a predetermined portion of the load at one speed may be improper at another speed.

According to the present invention the slave locomotive motors and brakes may be governed by the force sensed on the forward coupler of the slave locomotive and the velocity of the train in such a way that the slave locomotive is constantly attempting to bring this force on the front coupler to either substantially zero, or to some other amount depending on the position of the slave locomotive in the train and its predetermined share of the entire load. Also, the slave locomotive may be governed in accordance with the velocity of the train and the force sensed at the rear coupling of the slave locomotive so that the slave locomotive is constantly attempting to bring this force to the proper degree and type depending on the position of the slave locomotive in the train and its predetermined portion of the entire train load. To obtain the proper throttle or brake setting as the case may be, the operating condition of the slave locomotive is compared with the combination of the velocity and detected force.

According to one illustrated embodiment of the invention, the developed horsepower of the slave locomotive driving motors is converted to an analog voltage, and the speed of the locomotive is also converted into an analog voltage. The analog of the developed horsepower is divided by the analog of the speed to obtain an analog voltage representative of the linear force developed by the slave locomotive. Then the linear force to which the slave locomotive is subjected is converted into a voltage which may be algebraically added to the linear force developed voltage analog to provide an analog of the linear force required. The force required analog is multiplied by the speed voltage analog to produce a voltage analog representative of the horsepower required. The horsepower required analog then controls means for governing the operation of the helper locomotive accordingly. The brake settings are governed under dynamic braking conditions by the braking horsepower developed. This braking horsepower developed analog is divided by the speed analog to obtain the braking force developed. The analog of the braking force developed is added to the output from the strain gauge to obtain the force required. Then the speed analog is multiplied by the force required analog to obtain the analog of the horsepower required.

In other illustrated embodiments, the analog of the force on the coupling is multiplied by the analog of the speed to produce a third analog voltage corresponding to an equivalent horsepower at the coupling. Then the analog of the horsepower developed by the slave locomotive, which is determined by the main generator under power conditions, and the dynamic braking traction armature during dynamic braking, is compared by algebraically adding the horsepower developed analog to the third or equivalent horsepower analog voltage to produce the horsepower required analog for governing the operation of the slave locomotive.

Further, according to the present invention, certain embodiments provide for controlling the slave locomotive to share its predetermined portion of the train load during periods of acceleration and deceleration. When the controlling or lead locomotive increases its tractive effort, it is accelerating the entire train. However, only the force required to accelertae that portion of the train load behind the slave locomotive is sensed at the slave locomotive coupling. For example, if the slave locomotive has its full load behind it and is moving under substantially zero front coupler strain; and then the controlling locomotive increases horsepower, the force applied to the front coupler of the slave locomotive is less than the change of tractive effort of the controlling locomotive by an amount equal to the force required to accelerate the mass of the train between the slave and the lead locomotive. By considering the weight or resistance of the portion of the train behind the slave locomotive, the appropriate corrective factor is provided so that the slave locomotive provides its proportionate share of the load during acceleration and deceleration. Thus, the horsepower required analog as provided by the invention includes the horsepower required for the slave locomotive to accelerate its portion of the train.

In the illustrated embodiment wherein the force is sensed on the rear coupler of the slave locomotive, the combined velocity and force is modified by a train weight ratio factor that is adjustable in accordance with the position of the slave locomotive in the train and the portion of the entire train load that it is to carry. The corrective factor for acceleration is inherent by virtue of this train weight corrective factor.

In one of the illustrated embodiments where the force is sensed on the front coupler of the slave locomotive a correction factor for acceleration and position bias is summed with the analog of the equivalent horsepower at the coupling and also modifies the input analog prior to its being combined with the developed horsepower analog for obtaining the horsepower required analog. In another illustrated embodiment of the invention where the force is sensed on the front coupler, the combined velocity and force analog is algebracially added to the developed horsepower analog, and the analog of the sum as modified by a train weight ratio factor and the modified analog compared with the analog of the developed horsepower to obtain the horsepower required. If the horsepower of the slave locomotive unit is different than the horsepower of the controlling locomotive such as when multiple locomotive units are connected together then the required horsepower as computed multiplied by a ratio of the horsepower of the slave locomotive to the horsepower of the main or lead locomotive.

Referring to the drawings, particularly FIGS. 1A, 1B and 1C, a train is illustrated having a main locomotive 6 connected at the head thereof and a helper locomotive 8 coupled therein remote from the main locomotive. Cars 7 coupled between the locomotives 6 and 8 comprise the load for the main locomotive 6, and cars 9 connected behind the helper locomotive 8 comprise the load to be pulled by this helper locomotive. To measure the force existing between the cars 7 and the helper locomotive 8, a strain gauge 10 is connected to a common coupling or locomotive draw-bar 11.

The strain gauge 10 includes a resistor 12 that is connected in a bridge circuit that is comprised of resistors 13, 14 and 15. When any force is detected by the strain gauge 10 the bridge circuit is unbalanced so that if this force is in tension a voltage of one polarity will be present across its output, or if the force is in compression a voltage of the opposite polarity will be present across its output. An amplifier 16 is provided to amplify this output voltage so that it may be conducted through a smoothing device 17 which is comprised of inductors 18 and capacitors 19. This smooth amplified voltage is conducted by way of a wire 20 through a variable resistor 21 and resistors 22 and 23 that are included in a summing device 24.

The helper or slave locomotive 8 is also provided with a reverse direction detector 25 which controls a relay 26 in accordance with the direction of movement of the helper locomotive. When the locomotive is traveling in a forward direction the relay 26 is deenergized and when the locomotive is traveling in a reverse direction the relay 26 is energized. The relay 26 reverses the polarity of the voltage from the output of the bridge circuit through its contacts 27 and 28 and serves to reverse the effect of the compressive or tensile force to which the helper locomotive 8 is subjected.

The helper locomotive 8 is also provided with a frequency generator 30 which produces an output in accordance with the actual speed that the locomotive is traveling. The output from the frequency generator 30 is amplified by an amplifier 32 and an amplifier 33. The output of the amplifier 32 is connected to a voltage versus speed shaping device 34 to produce an output of the locomotive voltage on wire 35 proportional to the speed of the locomotive. The unit 34 is desirable in that it provides more sensitivity for the voltage which is indicative of the speed of the locomotive, particularly at low speeds. Because at low speeds the output from the frequency generator 30 is relatively small.

The output voltage from the amplifier 33 is connected to speed filters 37, 38 and 39. The speed filter 37 controls the operation of a relay 4R in a manner so that it is energized when the locomotive is traveling above four miles per hour. A relay 6R is operated by the filter 38 so that it is energized when the locomotive is traveling above six miles per hour. A relay 10R is controlled by the filter 39 so that it is energized when the locomotive is traveling above ten miles per hour. The relays 4R, 6R and 10R are used for controlling the selection of the power settings of the locomotive control apparatus 40, which will be described hereinafter.

The locomotive control apparatus 40 is well known in the art and includes the locomotive driving motors, generators, the primary power unit for motivating the generator and various relays and contactors for operating the same. The selections for controlling the locomotive engine control apparatus are governed by the energization of the wires 2A, 3A, 4A, 6A, 8A and the wire marked "idle," all of which correspond to various throttle settings of the prime mover. FIG. 2 of the drawings illustrates a typical table of examples for operating the locomotive control apparatus in accordance with the particular energized wires heretofore mentioned. The dynamic braking of the locomotive is selected in varying degrees by the resistance across the lower gradient of potentiometer 57P3 as controlled by its arm 112.

In FIG. 1A, the main generator of the helper locomotive 8 is referred to at 41. The armature of the main generator 41 is connected across buses 42 and 43 which are illustrated in heavy solid lines. The buses 42 and 43 which comprise the main power circuit transmits the power from the generator 41 to the driving motors of the helper locomotive. These motors are shown in FIG. 1C and referred to at 45 and 46. For the sake of clarity, of illustration, when power is required, the locomotive control circuitry connects the motors 45 and 46 and the main generator 41 as shown in FIG. 1A. On the other hand when dynamic braking is required of the helper locomotive, the locomotive control apparatus connects the motors and the generator as shown in FIG. 1C. In FIG. 1C the field windings of the motors 45 and 46 are referred to at 47 and 48; and the field winding for the main generator 41 is referred to at 50.

In the embodiments of the invention illustrated in FIGS. 1A, 1B, 1C and FIG. 3 the system is shown to include a number of micropositioning units or servo mechanisms referred to at 51, 52, 53, 54, 55, 56, 57, 58, 59, 60 and 61 in the drawings.

Each one of these positioning units includes a relay, a positioning motor, and a plurality of potentiometers which are controlled by the respective motors. In the drawings, the mechanical connection between the motors of each positioning unit and the variable arms on the potentiometers associated therewith are shown connected by a dashed line. These dashed lines which schematically illustrate the mechanical connections are offset from the center point of the variable arms so that there will be no confusion between the mechanical designation and the electrical circuitry. The control relay for each positioning unit bears an identical reference character as that for its associated unit only with the prefix R. Similarly each motor of a unit bears an identical reference character with its associated unit only with the prefix M, and the potentiometers of each positioning unit bear an identical reference character as its unit only with the suffix P. Because there is more than one potentiometer associated with each unit, each one has a numerical suffix to differentiate between potentiometers of the same unit. Thus, the unit 51 for example, includes a motor M51, relay R51, and potentiometers 51P1 and 51P2.

Each one of the micropositioning units 51 through 61 operates in a similar manner. The contact of each relay R is normally in a neutral position when no current is flowing through its winding. When current of one polarity is energizing a control relay R, its associated arm will close one circuit to drive its associated motor M in one direction; and when it is energized by current of opposite polarity its arm will form another circuit to operate the associated motor M, in the other direction. For example, with respect to the unit 51 when the voltage is more positive at arm 65 or the plus designation of the relay R51 than it is at arm 66, the relay R51 is energized to close its back contact 67 for operating the motor M51 in a counterclockwise direction as viewed in the drawing. On the other hand if the voltage on the arm 66 is more positive than that on the arm 65, the relay R51 will be energized to close its front contact 67 to operate the motor M51 in a clockwise direction as viewed in the drawings. The operation of the motor M51 in a clockwise direction causes the arms 65 and 68 of the potentiometers 51P1 and 51P2 respectively to also move in a clockwise direction. This movement continues until there is no current flow through the relay R51 which causes the contact 67 to again assume a neutral position to stop the motor M51. Each unit is so connected that the movement of the various arms of the potentiometers associated therewith as caused by their respective motor is always in a direction to bring any voltage existing across the control relay to substantially zero.

Limit switches, referred to at LS are provided in the motor driving circuits whenever required. For example, a limit switch LS1 is included in the driving circuit of the motor M55 of the unit 55; and a limit switch LS2 is included in the driving circuit of the motor M60 of the unit 60, which prevent the respective motors from being driven beyond a practical limit.

The positioning unit 51 is controlled by the voltage that is present across buses 42 and 43 for driving the motors as shown in FIG. 1A. The positioning unit 52 is controlled by the current across the buses 42 and 43 as shown in the circuit of FIG. 1A. Thus, an analog of the voltage as represented by the position of arm 68 of the potentiometer 51P2, and an analog of the current represented by the position of arm 70 of the potentiometer 52P2 is multiplied to control the positioning unit 53.

The unit 53 as controlled by the units 51 and 52 provides an analog voltage of the horsepower developed in the driving motors 45 and 46 (FIG. 1C) as is represented by the position of arms 72 and 73 of the potentiometers 53P1 and 53P2 respectively.

The positioning unit 54 is controlled by the output voltage from the frequency generator 30 over the wire 35 to provide an analog voltage of the actual speed of the train as represented by the positions of arms 75 and 76 of potentiometers 54P1 and 54P2 respectively.

The positioning unit 55 in effect divides the analog of the horsepower developed in the driving motors as represented by the position of the arm 73 of 53P2, by the analog of the speed of the helper locomotive 8 as represented by the position of the arm 76 of the potentiometer 54P2 to produce an analog voltage which is representative of the power torque of the locomotive motors 45 and 46. This power torque is represented by the positions of arms 77 and 78 of the potentiometers 55P1 and 55P2 respectively.

The power torque as represented by arm 78 of the potentiometer 55P2 is conducted over a wire 80 through a front contact 81 of a dynamic braking relay DBR; and the analog of the voltage as produced by the operation of the strain gauge 10 as hereinbefore described is conducted to the summing device 24 for controlling the positioning unit 56 (FIG. 1B). The summing of the analog voltage of power torque and the analog of the voltage of the force at the coupling 11 determines the position of arm 83 of potentiometer 56P1. The position of the arm 83 is representative of the torque required of the helper locomotive to reduce the force to substantially zero.

The potentiometer 54P3 of the unit 54, has an arm 84, the position of which is representative of the analog of speed of the locomotive, and in accordance therewith it cooperates by way of a wire 85 with a potentiometer 56P2, the arm 86 of which is representative of the torque required. This cooperation in effect multiplies the analog of the speed with the analog of the power torque required to control a positioning unit 57 to obtain the horsepower required of the helper locomotive to reduce the force to substantially zero. The horsepower required is dependent upon the position of arm 88 of the potentiometer 57P2. The position of arm 90 of switch 57S1 which also is representative of the horsepower required controls a dynamic braking relay DBR.

If the arm 90 is resting on the upper quadrant of switch 57S1 the relay DBR is energized so that its front contact 92 is closed to energize the power wire leading to the locomotive control apparatus 40. When the arm 90 is resting on the lower quadrant of the switch 57S1 the back contact 92 of the relay DBR is closed to energize the braking wire leading to the locomotive control apparatus 40.

The unit 57 also controls a segmented switch 100 which includes a variable arm 101 to selectively energize the various engine control wires for selecting the proper throttle control of the locomotive apparatus 40.

Energy to the arm 101 of the switch 100 is controlled by the condition of an air brake pressure switch 103 and an emergency brake detection switch 104. When the emergency brakes are applied, contact 105 of the switch 104 opens which removes stick energy from relay EM. This causes relay EM to drop away and closes back contact 106 so that the "idle" wire for causing the locomotive engine to idle is energized. A reset button 110 is provided so that when the abnormal condition is corrected the control apparatus 40 may again be controlled through the position of the arm 101 of the switch 100. Also, when the air brakes are applied by the main locomotive contact 107 of the switch 103 opens to deenergize a relay B. The deenergizing of the relay B causes its back contact 108 to close which also removes energy from the arm 101 and energizes the "idle" control wire of the locomotive control apparatus until the brakes are released.

The position of the relay DBR, which is energized when the switch 57S1 has its arm 90 in the upper quadrant and is deenergized when the arm 90 is in the lower quadrant, renders the positioning units 58 and 59 effective when braking of the locomotive is required in accordance with the motor and generator circuit illustrated in FIG. 1C. Also, the positioning unit 57 has a potentiometer 57P3 (see FIG. 1C) which is comprised of an arm 112 that engages the resistance portion or lower quadrant of the potentiometer when dynamic braking is called for and engages a nonresistive portion or upper quadrant when the dynamic braking circuitry of FIG. 1C is not effective.

When the relay DBR is deenergized the positioning unit 58 is controlled by the voltage which is present across the buses 42′ and 43′ (FIG. 1C). Also, the positioning unit 59 is controlled by the current through the buses 42′ and 43′ when the relay DBR is deenergized.

The voltage existing across the buses 42′ and 43′ is multiplied by the current existing across these buses by potentiometers 58P1 and 59P1 in accordance with the position of their arms 116 and 117 respectively. This controls a positioning unit 61 to provide a voltage analog of the braking horsepower that exists in the motors. This analog of brake horsepower through arm 118 of the potentiometer 61P2 is divided by the voltage analog of speed as represented by arm 120 of the potentiometer 54P4. This controls a positioning unit 60 which provides a voltage analog of the braking torque developed. The voltage analog of the braking torque developed is indicated by the position of arm 122 of the potentiometer 60P2 to provide an output over wire 124 which is connected through back contact 81 of the relay DBR (FIG. 1A) to a wire 80 which together with the voltage on wire 20 and the position of arm 84 of 54P3 ultimately controls the positioning unit 57 (FIG. 1B). This provides the horsepower required analog for operating the locomotive control apparatus. Thus, the horsepower required for operating the locomotive control apparatus may either be controlled by the braking torque or the power torque required of the locomotive in conjunction with the speed and the force to which the coupling 11 of the locomotive 8 is subjected.

With regard to the power circuit connected to the buses 42 and 43 of FIG. 1A, a resistor 125 is connected in series in the bus 43 for monitoring the current drawn by the locomotive driving motors. This resistor 125 may be a conventional meter shunt resistor so that a voltage developed across it will be proportional to the current drained through it. It should be sufficiently accurate and reliable so that its value will not be effected by ambient temperature conditions or with the temperature rise induced by the current flowing through it.

Referring to FIG. 1C, the motors 45 and 46 of the locomotive 8 are being driven as generators by the momentum of the locomotive along the track when the relay DBR is deenergized. Their armatures in this condition are in effect connected in series across the buses 42′ and 43′, and the energy transmitted by these buses is dissipated in grid resistors 126 and 127 which are connected across the buses 42′ and 43′ as a loading device. Under these conditions, the motor field windings 47 and 48 are supplied by a voltage from the main generator 41 to control the field flux in these windings. The output of generator 41 is controlled by the flux provided in its own field winding 50 which is connected across the output voltage generated by the motors 45 and 46 in series. Resistors 130 and 131 are of a value to provide proper excitation of the generator field, when the resistance of the potentiometer 57P3 varies as the arm 112 moves across the lower quadrant. When the arm 112 is in the lower quadrant, additional voltage as applied to this generator field 50 will increase. Under conditions of extreme braking when the arm 112 includes all of the resistance of the potentiometer 57P3 then the voltage across the generator field 50 will be at a maximum. Consequently, the current supplied by the generator 41 will be at a maximum and the voltage developed across each field winding 47 and 48 of the motors 45 and 46 respectively will be at a maximum. A resistor 133 is inserted in the bus 43′ to monitor the dissipation current, and is of the same type as the resistor 125. A more detailed description of the method and apparatus embodying the present invention will be described in connection with its operation hereinafter.

In operation, assuming that a train having a helper locomotive equipped in accordance with the present invention is operating in a forward direction with the helper locomotive pulling its proper share of the train load, there is little or no force to which the strain gauge 10 is subjected. This lack of force shows that the helper locomotive 8 is operating properly with its throttle setting properly positioned, and there is little or no output from the amplifier 16 to the wire 20 which leads to the summing device 24. The voltage on wire 35 at the output of the voltage versus speed shaping unit is such to cause the positioning unit 54 to have its motor M54 position the arms 75, 76, 84 and 120 in a predetermined position in accordance with the analog of this speed. Also, the voltage and current which is present across the buses 42 and 43 in FIG. 1A causes the positioning of units 51 and 52 as previously described, so that the arm 68 of the potentiometer 51P2 and the arm 70 of the potentiometer 52P1 represent an analog of this voltage and current. The unit 51 from which the analog of the voltage is obtained, has an arm 66 which is fixed to select some portion of the monitored voltage from a resistor 150. A resistor 151 is adjustable so that a value of the upper portion of the potentiometer 51P1 including this resistor 151 may be changed with respect to the lower portion of the potentiometer to provide a scaling factor by which the selected voltage from the resistor 150 must be multiplied. This selected voltage must always be considered to be measured with respect to the common side of the battery referred to at C which in this circuit is connected in common with bus 43 of the motor driving circuit. Assuming a change of voltage between buses 42 and 43, a voltage appears across relay R51 to operate the motor M51 in either a clockwise or counterclockwise direction to reduce the voltage across R51 to zero. When the arm 65 arrives at a point of the potentiometer 51P1 which is just as positive as the positive potential existing on arm 66 the relay R51 assumes its neutral position to stop the motor M51. Thus, the position of the arm 65 represents an analog of the voltage existing across the buses 42 and 43.

The positioning unit 52 is controlled by the voltage across the resistor 125 which is indicative of the current circulating through the buses 42 and 43. Thus in a manner similar to the positioning unit 51, when the relay R52 is balanced the arms 153 and 70 represent an analog of the current drawn by the motors 45 and 46. This current analog is multiplied by the voltage analog to obtain the horsepower developed. The circuit for obtaining the horsepower developed includes the potentiometer 51P2, the arm 68, the potentiometer 52P2, and the arm 70, the relay R53 and the potentiometer 53P1. A variable resistor 154 is included to adjust the scaling factor for this analog voltage of the horsepower developed. Thus, when the voltage across the relay R53 is balanced, the arms 72 and 73 are in a position which represents an analog of the horsepower developed.

To determine the torque developed, the horsepower developed is divided by the analog of the speed in accordance with a divisional circuit which includes the arm 76 on the potentiometer 54P2, a variable resistor 156, the potentiometer 55P1, the arm 77, the relay R55, the variable arm 73 and the potentiometer 53P2. When no voltage drop exists across the relay R55 this circuit including the potentiometer 53P2 is balanced. This in effect causes the horsepower developed to be divided by the speed to produce a power torque developed as represented by the positions of arms 77 and 78 of the potentiometers 55P1 and 55P2 respectively. This voltage analog of the power torque developed is conducted by the potentiometer 55P2, over its arm 78, through front contact 81 of the relay DBR, over wire 80, through a resistor 157, and into the amplifier 158 of the summing device 24. Thus, when no strain is present at the coupling 11 the torque required is determined solely by the power torque developed as represented by the position of the arm 78 of the potentiometer 55P2. The analog of the torque required is represented by the position of the arm 83 of the potentiometer 56P1. Variable resistors 160 and 160′ provide a scaling factor for the potentiometer 56P1. The torque required as represented by the position of the arm 86 of the potentiometer 56P2 is multiplied by the analog of the speed as represented by the arm 84 of the potentiometer 54P3 to produce a voltage across the relay R57 for controlling the motor M57 which positions the arm 88 of the potentiometer 57P2 until there is no voltage drop across the winding R57. When the voltage across the relay R57 is balanced, the arms 88 and 90 of the potentiometers 57P2 and 57P1 represent an analog of the horsepower required. Thus, it is further seen that the horsepower required is determined by an analog of the actual speed of the locomotive and an analog of the torque required to position the arms 88 and 90 as aforesaid. The position of the arm 101 is determined by the position of the arms 88 and 90 to select the proper throttle setting for the locomotive motors.

Assuming that the controlling locomotive applies more power, a tensile stress is applied to the coupler 11 which indicates that the helper locomotive must advance its throttle setting to compensate therefor. This tensile stress causes the resistor 12 of the strain gauge 10 to unbalance its bridge circuit connection to provide a voltage output through back contacts 27 and 28 respectively of the relay 26. This output is amplified by the amplifier 16 and applied to the filter network which comprises the inductances 18 and capacitors 19 to smooth out any peak voltages thereby providing a relatively smooth but varying D.C. potential on the wire 20. This additional energy is conducted through the summing device 24 which increases the output from the amplifier 158 so that the potential across the relay R56 is unbalanced. A back contact 165 of the relay R56 then closes to cause the motor M56 to rotate in a counterclockwise direction until the arm 83 of the potentiometer 56P1 produces a balance across the winding of the relay R56. The motor M56 then stops, resulting in a new postion of the arm 83 which is representative of the torque required. Simultaneously with the operation of the motor M56 the potential that exists across the relay R57 changes, thus causing a movement of the arms 88 and 90 which is indicative of a change in the horsepower required. If there were any change in the speed of the locomotive at this time the effect of the tensile stress on the change of the horsepower required would be modified by this different speed because of the change in the position of the arm 84 (FIG. 1A) of the potentiometer 54P3. In a situation where added horsepower is required, the arm 101 will advance to increase the throttle setting until the helper locomotive is again pulling its share of the load properly. It can readily be seen if the call for increased power was merely temporary which caused the strain on the coupling 11, and the main locomotive maintained its original speed when the increased power is no longer required, the absence of the added potential to the summing device 24 results in the return of the arm 101 to its previous setting before the call for power. However, if the strain was caused by a demand from the main locomotive to increase its speed from its original setting, this increased speed would prevent the arm 101 from being operated by the positioning unit 57 to its previous position.

Assuming that the operator of the main locomotive decreases the throttle setting slightly, a slight compressive strain will be placed on the coupler 11 due to the helper locomotive trying to maintain the same power, and it is apparent from the foregoing that this compressive stress will cause the horsepower required of the helper locomotive to retard the throttle setting in accordance therewith.

Assuming that the operator of the main locomotive now further decreases the throttle setting of the main locomotive and applies dynamic braking, the force applied to the coupling 11 is compressive thus causing an output voltage of negative polarity from the strain gauge 10. This opposite potential which is conducted over wire 20 to the summing device 24 is of sufficient value to unbalance the potential across the relay R56 so that the motor M56 operates arms 83 and 86 in a clockwise direction, produces negative voltage on the variable arm 86. This negative voltage is multiplied by the positive voltage analog of speed on the arm 84 of the potentiometer 54P3 and provides a negative voltage to the relay R57 which unbalances its winding to rotate the motor M57 a considerable distance in a clockwise direction so that arms 88, and 112 move into the lower quadrants of their respective potentiometers. The movement of the arm 90 of switch 57S1 to its lower quadrant deenergizes the relay DBR so that its back contact 92 closes and the dynamic braking wire extending to the locomotive control apparatus 40 is energized.

The energizing of the dynamic braking wire is effective to perform a switching operation within the locomotive control apparatus 40 in such a manner as to alter the connections of the motors 45 and 46 and the generator 41 from the connection as shown in FIG. 1A of the drawings to the connection as shown in FIG. 1C.

The helper locomotive in a dynamic braking condition has connected its motors to act as generators and the braking horsepower of the locomotive is a factor in determining the horsepower required. The braking horsepower is obtained from the positioning units 58 and 59 connected across the buses 42′ and 43′ in FIG. 1C, which are effective when the DBR relay is deenergized.

Under dynamic braking conditions (FIG. 1C) the armatures of the motors 45 and 46 are supplying a current to a load embodied in resistors 126 and 127. This energy is determined by measuring the voltage and current. The voltage is measured by the resistor 166 for controlling the positioning unit 58 and the current is measured by the resistor 133 for controlling the positioning unit 59. In order to obtain different degrees of dynamic braking it is necessary to regulate the flux which the motor armatures are cutting. This may be accomplished by connecting the field windings 47 and 48 across the armature of the generator 41. The current output from the generator is determined by the voltage across its own field winding 50. The field is now connected across resistors 130, 131, and the resistance portion of the potentiometer 57P3 in series. The control for the voltage across this resistive network which is connected in parallel with the resistors 126 and 127 is governed by the value of the resistance included in the potentiometer 57P3. The resistors 130 and 131 simply supply the required value of resistance so that a proper voltage will be generated across field winding 50 under various positions at arm 112 of 57P3. The more resistance cut into the potentiometer 57P3 by its arm 112, the greater will be the degree of braking. The arm 112 is mechanically connected so that under power conditions it resides in the upper quadrant of the potentiometer 57P3.

If the arm 112 does not cut into any portion of the resistance of the potentiometer 57P3, the residual field of the generator causes a small current to flow in the motor fields 47 and 48, thus only a small current flows in the buses 42' and 43'. This produces dissipation in the resistors 126 and 127. It must be recalled at this time that the motors 45 and 46 are being driven by the momentum of the train and therefore are acting as generators. When the potentiometer 57P3 causes a resistance to be added to the circuit that includes the field winding 50 a higher voltage is developed across motor fields 47 and 48 which causes a higher voltage on buses 42' and 43' which causes a higher current flow in the buses 42' and 43'. Whatever voltage is developed across the resistor 166 controls the position of arm 168 of the potentiometer 58P2. Also, the current flowing through resistor 133 will position the unit 59. A resistor 170 of the potentiometer 59P2 is adjustable to provide a scaling factor. This voltage and current is multiplied during the braking operation by potentiometers 58P1 and 59P1 to produce an analog of the braking horsepower in the positioning unit 61. The braking torque required is determined by dividing the analog of the potentiometer 54P4, potentiometer 61P2 and the potentiometer 60P1. Resistor 172 is provided to adjust the scaling factor. This division operation adjusts the potentiometers 60P1 and 60P2 to some value within its range. The limit switch LS2 is connected therein so that whenever the speed is zero, because it is the dividing factor, the arms 173 and 122 will not exceed their range.

The position of the arm 122 of the potentiometer 60P2 applies a negative voltage having a value indicative of the braking torque developed. This voltage is applied over the wire 124, through back contact 81 of the relay DBR, wire 80, and through the resistor 157 of the summing device 24. This increased braking torque developed when summed with the reduced compressive strain balances the relay R56 at the value previously determined so that the potentiometers 56P1 and 56P2 still have their arms resting on the proper negative voltage in the lower quadrants thereof. This negative voltage is multiplied by the positive voltage of the potentiometer 54P3 (speed analog) resulting in the positioning of the unit 57 so that the arms 88 and 90 rest on the same portion of the negative quadrant of the potentiometers 57P2 and 57P1 respectively.

Assuming that a greater degree of braking is called for which produces a greater compressive stress on the coupler 11, the negative voltage on wire 20 will cause the motor M56 to move in a still more clockwise direction thus causing motor M57 to operate the arm 112 clockwise to cut in more resistance. This produces additional excitation across the generator field winding 50, which as previously explained, produces a higher current dissipation within the resistors 126 and 127, and this in turn produces an additional braking horsepower output.

As the train slows down the compressive forces on the coupler 11 are reduced, thus reducing the negative potential on the wire 20 which compensates for the more negative voltage being applied from the braking torque developed over the wire 124 and the wire 80 to the summing device 24. Thus, the helper locomotive 8 is at all times attempting to maintain the pace set by the main locomotive.

The application of the brakes by the main locomotive causes the relay B to also drop away which immediately applies energy through its back contact 108 to the "idle" control wire of the locomotive control apparatus.

During the operation of the system the condition will occur when there is no force on the forward coupler and the only negative voltage applied to the summing device 24 will be that from the potentiometer 60P2 of the braking torque developed unit 60. If the main locomotive applies enough power, a condition will result in a tensile force appearing on the coupling 11 which will cause a positive voltage to be conducted to the summing device 24 that is sufficient to overcome the negative voltage from the braking torque developed unit 60. This will cause the arm 101 to engage its "idle" or power position and the relay DBR will again become energized to apply a positive potential through the front contact 92 leading to the locomotive control apparatus 40.

When the train first starts up it will be accelerating under high torque conditions and the coupler 11 receives a high tensile stress to produce a relative large output over the wire 20. This results in a high horsepower requirement which would position the arm 101 perhaps to its maximum position on the switch. However, because of the filters 37, 38 and 39 and their associated relays 4R, 6R and 10R, such a maximum position would still provide that the throttle wire 3A is energized because the back contacts 49, 48 and 47 of the relays 10R, 6R and 4R would be closed. If the train accumulates speed and gets above four miles per hour for example this same setting of the arm 101 would cause the throttle wire 4A to be energized because of the closing of front contact 47. Similarly as the train increases speed above six miles per hour and ten miles per hour, this same position would cause an increase of the throttle setting through the front contacts 48 and 49 respectively. Thus, as the train accumulates speed the source potential is applied to the next higher power wire leading to the locomotive control apparatus 40. Each of these higher power wires successively connects the control apparatus to provide more horsepower which results in higher speed.

When the train is operating in reverse direction the system operates in a similar manner, with the exception that a compressive stress on the coupling 11 will cause an advance in the throttle setting and a tensile stress will cause a retardaiton of the throttle. This is accomplished by a direction detection device which causes the relay 26 to be energized when the locomotive is detected traveling in reverse. This pole changes the output from the strain gauge 10, to produce the voltage analog of the same polarity for compressive force that it previously had for tensile force when it was traveling in the forward direction.

Referring to FIG. 3, in situations where the full load of the helper locomotive is not coupled behind it, the system may be arranged so that the helper locomotive will not only provide the power for pulling the cars coupled to the rear of it but will also provide some of the power for pushing those cars that are coupled in front of it. Also, where more cars are coupled to the rear of the helper than the helper locomotive is able to pull, the system may be arranged so that the main locomotive is aiding the helper locomotive in pulling the cars which are coupled thereto. When the helper locomotive is pushing as well as pulling to provide the proper share of the train load there is normally a force in compression on its forward draw-bar or coupler; and when the main locomotive is aiding the helper locomotive in pulling the cars coupled behind the helper locomotive, there is normally a force in tension at the forward draw-bar or coupling. This is accomplished by providing a biasing voltage which opposes the output voltage from the strain gauge so that the tractive effort or power torque required of the helper locomotive is governed not only by the output from the strain gauge but also by the biasing voltage.

The biasing voltage is obtained by potentiometers 56P3 and 56P4 which are added to the positioning unit 56 that determines the tractive effort or power torque required of the locomotive. This biasing voltage is taken from the arms 208 and 210 of the potentiometers 56P3 and 56P4 respectively. The polarity of the arm 208 is negative when it is resting in the upper quadrant of the potentiometer, and the arm 210 is positive when it is engaging the upper quadrant of its potentiometer. It follows that when arm 208 is in the lower quadrant the polarity of the arms are positive and negative respectively.

A pole changing switch 212 is provided for changing the polarity of the biasing voltage in accordance with whether the normal operation of the helper locomotive calls for a compressive force or a tensile force. The output from the switch 212 is conducted to a potentiometer 214 which is adjustable so that the sensitivity of the system may be controlled. The output from the potentiometer 214 is conducted through a variable resistor 215 and a resistor 216 to the summing device 24.

Assuming that a tensile force is to be present at the forward coupling when the helper locomotive is properly sharing the required train load, there will always be a positive signal on the wire 20 leading to the summing device 24 as hereinbefore described. Thus, the switch 212 would have its arm 220 engaging terminal 221. This would cause a negative potential to be applied to wire 222 connected to the summing device 24. In the event that a compressive force should be present at the forward coupling the arm 220 is operated to engage terminal 224 so that a positive biasing potential appears on the wire 222 when the helper locomotive is properly sharing the load.

It will be noted that the actual value and polarity of this biasing voltage after the proper adjustments have been made in the potentiometer 214 and resistor 215 is determined by the tractive effort or power torque required of the helper locomotive. Thus, as the tractive effort required changes, the biasing potential changes accordingly which insures that the helper locomotive will operate properly under various conditions and will properly slow down and come to a stop even though the system normally calls for a force in compression or tension at the coupling. Although the biasing voltage is shown dependent upon the tractive effort required, it is contemplated that it may also depend upon the horsepower required of the helper locomotive if desired. When the train is traveling in a state of equilibrium the biasing voltage is equal and opposite to the strain voltage.

Although, in the heretofore described embodiments of the invention the analog of the strain is added to the power torque or tractive effort developed to obtain the power torque required, it is contemplated that the analog of the strain may be mutiplied by the speed analog of the locomotive to obtain an equivalent horsepower, and this equivalent horsepower may be algebraically added to the developed horsepower to obtain the horsepower required.

With reference to FIG. 4, a system is shown which utilizes conventional electronic components for obtaining the required horsepower of the helper locomotive. Also, instead of controlling the locomotive motor and braking apparatus directly, the sytem shows an indicator which is connected to the segmented switch 100 so that an operator on the helper locomotive can control the various throttle and brake settings in accordance with the indications which are visible on the indicator. Although the indicator in FIG. 4 illustrates a plurality of lamps which are selectively illuminated by the arm 101 of the switch 100, it is contemplated that a movable type indicator having the various speed and brake settings thereon may be substituted.

In FIG. 4 the outputs from the strain gauge and the frequency generator are connected to a multiplier 250 to obtain an equivalent horsepower, the horsepower developed from the multiplier 251 is added by a conventional adding device 252 to the equivalent horsepower to obtain the horsepower required for positioning the arm 101 of the switch 100. It is also apparent in FIG. 4 that the horsepower developed is obtained by multiplying the voltage and current from the main generator of the locomotive. Further, under dynamic braking conditions the grid voltage and the grid current are multiplied and conducted to a polarity inverter 253, the output of which is connected to the adding device 252 for obtaining the horsepower required under dynamic braking conditions.

Figure 6:
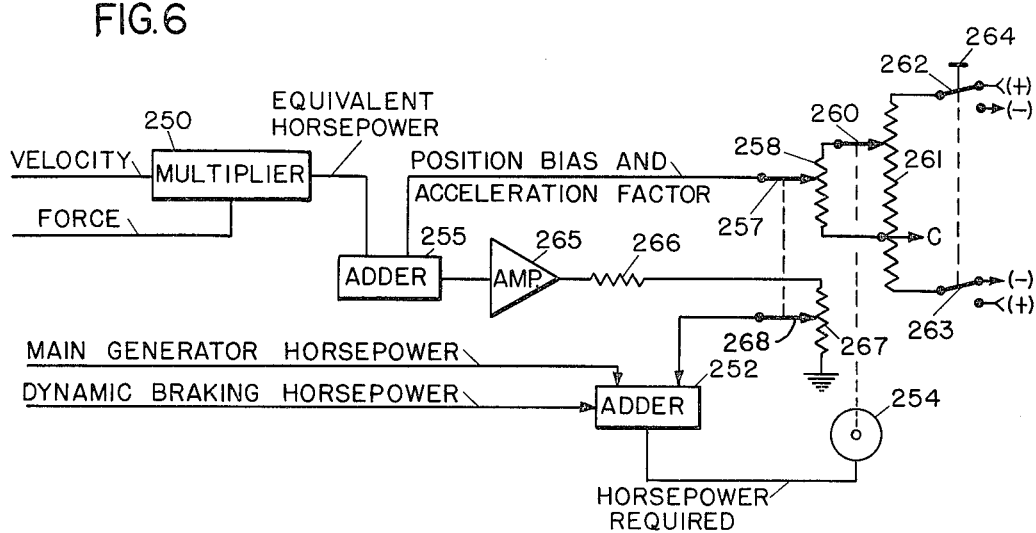
FIG. 6 illustrates diagrammatically a form of apparatus which may be incorporated in a system using the force on the front coupler so that the helper locomotive assumes its share of the load during acceleration.

Referring to FIG. 6, which shows the additional apparatus that may be incorporated in the embodiment of FIG. 4 for example, includes an additional adding device 255 which algebraically adds the output voltage analog 255 from the multiplier 250, which analog corresponds to the equivalent horsepower at the front coupler, with a position bias analog voltage obtained through arm 257 and a potentiometer 258. One end of the potentiometer 258 is connected to an arm 260 of a potentiometer 261. The other end of the potentiometer 258 is connected to a center tap of the potentiometer 261. Opposite ends of the potentiometer 261 are connected through contacts 262 and 263 of a switch 264 to a source of positive potential. The switch 264 is manually operated so that its contacts 262 and 263 are connected to alternate opposite polarities dependent upon whether the slave locomotive has some of its load ahead of it in the train or more than its proportionate share of the load coupled to the rear. The arm 257 of the potentiometer 258 is manually set in accordance with the portion of the whole train which is coupled to the rear of the slave locomotive. The output voltage from the adder 255 is amplified by an amplifier 255 and connected through resistor 266 and a potentiometer 267 to ground. The output from the potentiometer 267 is connected through its arm 268 to the input of the adder 252, the output of which is a voltage analog of the horsepower required of the slave locomotive. As illustrated and described in connection with FIG. 4, the torque motor 254, the position of which corresponds to the voltage analog of the horsepower required, is connected to adjust the arm 260 of the potentiometer 261. The arm 268 of the potentiometer 267 is connected to be manually adjusted with the arm 257 of the potentiometer 258 depending upon the portion of the train which is coupled to the rear of the slave locomotive. The motor 254 can be controlled in accordance with voltage similar to the control of motor M57 of FIG. 1B.

Assuming that the slave locomotive has its full load behind it, the control locomotive will be accelerating the entire train and only the force required to accelerate that portion of the train behind the slave locomotive is indicated at the slave locomotive coupler. Assuming that the slave locomotive has 50 percent of the entire train load coupled to the rear, the arms 257 and 268 of the potentiometers 258 and 267 respectively are adjusted so that the correction factor is two. In other words, a voltage analog is added to the equivalent horsepower coupling analog so that the locomotive senses twice as much force at the coupling during acceleration. The position bias voltage from the arm 257 of the potentiometer 258 also includes a bias which is added to the output of the multiplier 250 depending upon whether or not the slave locomotive has more or less than its load coupled behind it. If the slave locomotive has less than all of its load coupled behind it there will be a force in compression on the front coupler when it is sharing its predetermined portion of the train load and the switch 264 is operated so that its contact 262 is connected to a positive source of energy and its contact 263 is connected to a negative source of energy so that there is at all times a positive biasing signal applied to the potentiometer 258 so that the slave locomotive will operate to maintain the proper amount of compression on the front coupler. The amount of this bias is varied by the arm 260 which is positioned by the torque motor 254 that is controlled by the horsepower required analog signal from the adder 252. The corrective factor provided by the potentiometer 258 and the potentiometer 267 further modifies the output from the adder 255 so that the force sensed on the front coupling includes the corrective factor. Therefore, with 50% of the train load behind the helper locomotive, the voltage analog signal with the corrective factor is twice what it would be without hte corrective factor. With the arrangement in FIG. 6, this factor is included along with the bias for the position of the slave in the train relative to its load and combined with the equivalent horsepower signal to modify either the developed horsepower from the main generator or the horsepower under dynamic braking conditions. The adding device 252 may include the input from both the device for obtaining the developed horsepower of the slave locomotive under power conditions and the device for determining the dynamic braking horsepower of the slave locomotive under power conditions and the device for determining the dynamic braking horsepower of the slave locomotive under dynamic braking conditions because they are mutually exclusive. That is, when the slave locomotive is being operated under power conditions there is no output corresponding to a dynamic braking analog and when the locomotive is being operated under dynamic braking conditions there is no voltage analog output corresponding to the developed horsepower under power conditions. Although the arrangement of FIG. 6 illustrates the correction factor for acceleration as governed by the potentiometers 258 and 267, combined with the horsepower equivalent at the coupling and the position bias voltage, in order for the acceleration correction to be effective when the slave locomotive is displaced from its exact load, it is possible, in the alternative to convert the position bias voltage to an equivalent force, then add this to the force voltage and multiply the total by the acceleration correction factor and then convert this to an equivalent horsepower. However, in order to accomplish similar results under the latter explained method, more equipment is required than is shown in FIG. 6. In the arrangements of FIG. 6, the potentiometer 260 is controlled by the voltage analog of the horsepower required through the positioning motor 254 so that the voltage from the potentiometer 261 is always proportional to the horsepower required of the slave locomotive.

Figure 7:
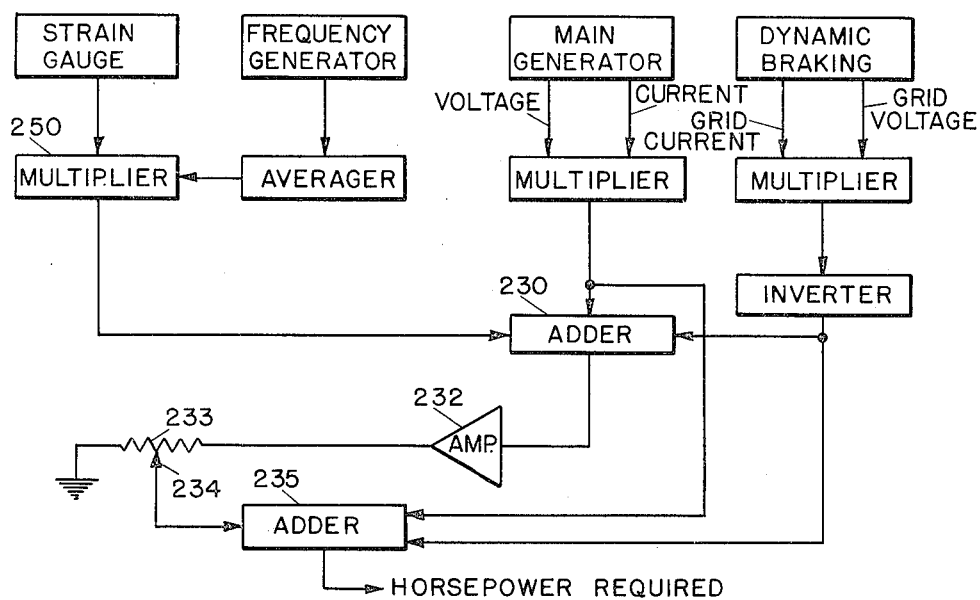
FIG. 7 illustrates partly in block diagram and partly schematically a system according to still another embodiment of the invention, wherein the force is sensed at the front coupler.

In FIG. 7, another organization of a system is illustrated wherein the force is sensed on the front coupler of the slave locomotive and which operates so that the slave locomotive provides its proper share of the train load during acceleration and when more or less than its load is coupled to the rear thereof. As in the previously described embodiments an analog voltage from a strain gauge is multiplied by an analog voltage from a frequency generator to obtain an analog corresponding to an equivalent horsepower on the output of the multiplier 250. An analog corresponding to the developed horsepower on the slave locomotive under power and dynamic braking conditions is provided by the main generator and dynamic braking traction armature similar to FIG. 4. The horsepower developed analog is then summed with the equivalent horsepower analog by adding device 230. This output from the adder 230 is amplified by amplifier 232, the output of which is connected to an adjustable potentiometer 233. The output from the potentiometer 233 is connected by its arm 234 to adding device 235. Also the horsepower developed analog under either power and dynamic braking conditions is connected to the adding device 235 to obtain the horsepower required analog signal at the output thereof.

The potentiometer 233 is adjusted in accordance with a train weight ratio which is the train weight behind the slave locomotive to the weight of the entire train. This may be expressed as $$R = \frac{W_3}{W}$$

where $R$ = the train weight ratio
$W$ = the weight of the entire train
$W_3$ = the weight of the train behind the slave locomotive.

The amplifier 232 amplifies the sum of the signals so that the output therefrom which is substantially greater than 1, is properly scaled in accordance with the slave's position in the train. If the arm 234 is set at the midpoint of potentiometer 233, the helper locomotive is providing one-half of the total train load. If it is set closer to the right as viewed in FIG. 7, it is providing more than one-half the train load. If it is set closer to the left as viewed in FIG. 7, the system will operate to provide less than one-half the train load.

The equivalent horsepower analog is algebraically added by the adder 230 to the developed horsepower analog. The output from the adder 230 as modified by the potentiometer 233 is then added algebraically by the device 235 to the developed horsepower analog to obtain the horsepower required analog as will be more fully understood in accordance with the following.

Assume all cars are of equal weight and rolling resistance, and the two locomotives are of equal power. According to FIG. 8, it is seen that there are two settings for the slave locomotive under steady state conditions; when the slave locomotive is to provide power for only the cars behind it, and when it is to provide power for one-half of the total cars of the train. These settings require only that it be designated as to where the slave is relative to its own portion of the train. The slave will react in a manner such that, during transient acceleration conditions, the horsepower required as computed on the slave, will always be less than the horsepower being generated by the lead locomotive. The reverse is true for decelerating conditions. A somewhat better computation on the slave locomotive would allow it to determine what the lead locomotive horsepower is during changing conditions, and assume that value to be the required horsepower. This requires the slave locomotive to know where it is within the total train.

Let us examine the equation for the horsepower required for each of conditions above, both when the sensor is on the front coupler and also when the sensor is on the rear coupler. The condition where the slave locomotive is providing power for only those cars behind it, and the strain gauge is on the front coupler of the slave locomotive, will be first considered.

It is easily seen that under steady state conditions, it is desired that the equivalent coupler horsepower $HP_q = 0$. However, this does not express the required horsepower, $HP_r$, as an absolute value. We can write, however, $$HP_r = HP_d + HP_q$$

where $HP_d$ is the horsepower being generated or developed by the locomotive and assigning $HP_q$ as positive for tension on the coupler.

It is seen that under steady state conditions the $HP_d$ is equal to that required to just maintain the force at the coupler equal to zero.

If the lead locomotive increases horsepower it will begin to pull the slave. Thus the force at the strain gauge becomes greater than zero and calls for a greater $HP_r$. If the lead locomotive decreases horsepower the slave locomotive front coupler is compressed, and the force at the strain gauge appears as a negative value initiating a reduction in $HP_r$. Thus it is seen that the $HP_r$ of the slave locomotive responds to the change in force at the front coupler.

Figure 8:
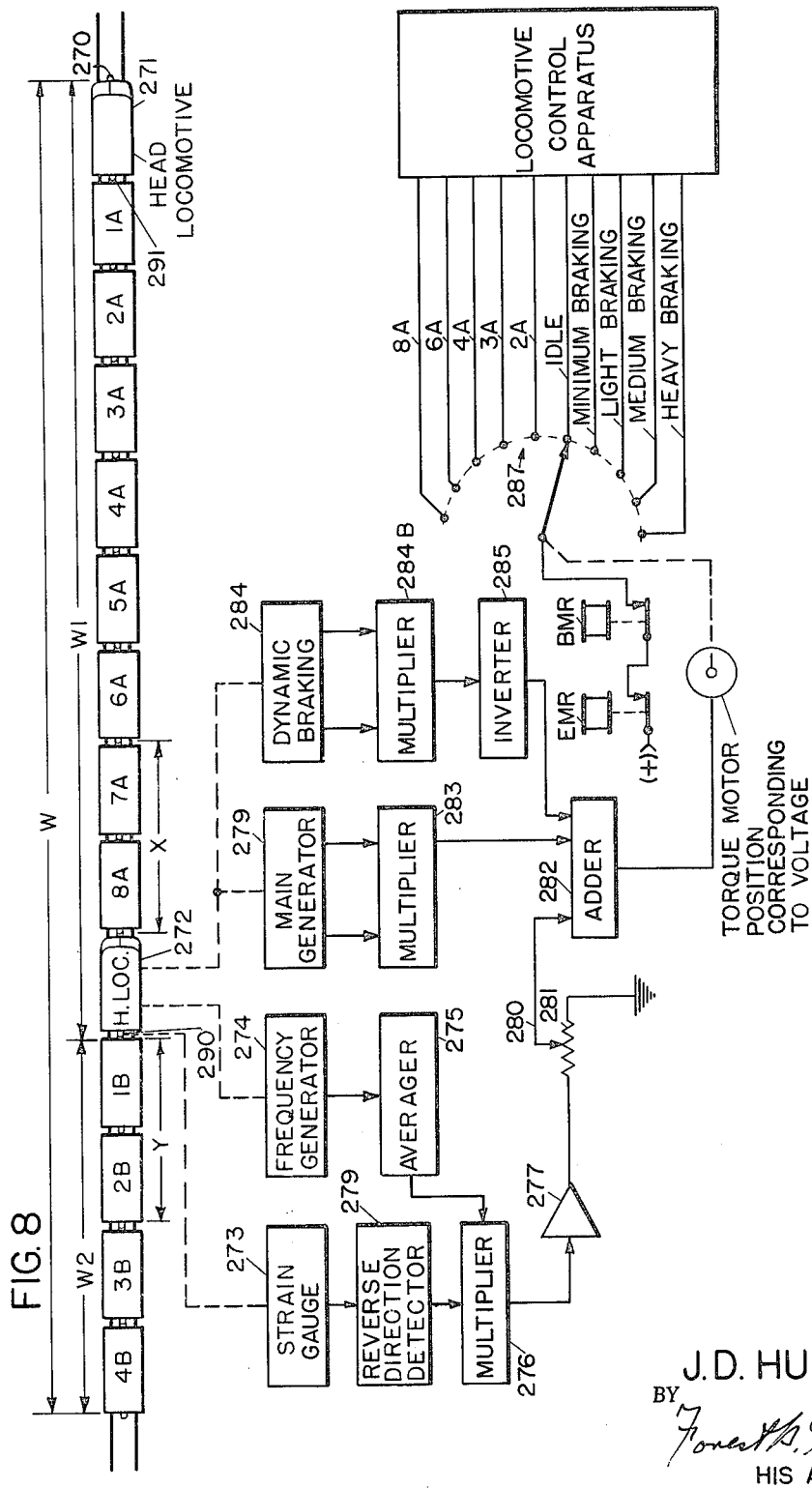
FIG. 8 illustrates in block diagram another organization of a system wherein the force is sensed on the rear coupler and the slave locomotive assumes its proportionate share of the load during acceleration.

Consider the condition wherein the strain gauge is on the front coupler of the slave locomotive; and the slave locomotive is providing power for half of the total train. If the slave locomotive is to provide the power for the two cars ahead of it as shown in FIG. 8 we can write for steady state $$HP_r = HP_d - HP_q + HP_q$$

$HP_q$ is positive for tension in the coupler.

Now for steady state $KHP_d = -HP_q$; therefore $$HP_r = HP_d(1+K) + HP_q$$

where $K$ = ratio of weight of cars ahead of slave, but within its own train, to the weight of the total slave train.

Now it is seen that if the lead locomotive increases horsepower, the compression in the coupler decreases causing the $HP_q$ term to become less negative thus causing the $HP_r$ to increase. The opposite occurs if the lead locomotive decreases horsepower.

In both the aforesaid conditions, it is noted that the position of the slave within the total train is not considered. The response of the slave is only to the reaction at the coupler.

If the lead locomotive increases horsepower, the total train begins acceleration. Only that force to accelerate the mass behind the slave appears on the slave coupler. Thus the slave reacts to a change of force which is less than the change actually made by the lead locomotive. However, the actual change in force initiated by the lead locomotive can be obtained by multiplying the change in force detected at the slave coupler by the ratio of the weight of the total train to the weight of that portion of the train behind the slave (hereafter called the train weight factor). It is the aim of the system to have the slave locomotive action duplicate the action of the lead locomotive. Thus if we use R as the train weight factor, which is defined as stated above, we can improve the system by calculating the actual change initiated by the lead locomotive and use this value to set the $HP_r$ of the slave locomotive.

The equation for the situation where the slave provides power for the cars behind it, then becomes $$HP_r = HP_d + (R)HP_q$$

if acceleration correction is taken into account. It is easily seen, since R is always greater than 1, that a change in $HP_q$ results in a greater change in $HP_r$ than for this condition without acceleration correction, and thus the overall system response is better.

For the situation where it provides power for one-half the total train the acceleration correction is arrived at as follows $$HP_r = HP_d + (K)HP_d + HP_q$$

without acceleration correction.

Since the first term is not a function of the force on the coupler, that term is not multiplied by the train weight ratio R then $$HP_r = HP_d + R(KHP_d + HP_q)$$
$$= HP_d + RKHP_d + RHP_q$$

for FIG. 8

$$RK = \frac{W}{W_2} \cdot \frac{X}{W_2 + X} = \frac{W}{W_2} \cdot \frac{W - W_2}{W/2}$$

$$= \frac{W - 2W_2}{W_2} = R - 2$$

$$HP_r = HP_d + (r-2)HP_d + RHP_q$$
$$= (R-1)HP_d + RHP_q$$

For the train shown in FIG. 8 steady state conditions becomes $$HP_r = (3-1)HP_d + eHP_q$$

Now $$HP_q = -\frac{2}{6}HP_d$$

since one third of the train being supplied power by the slave is ahead of it and compression on the coupler makes $HP_q$ negative thus $$HP_r = 2HP_d + 3\left(-\frac{2}{6}\right)HP_d$$
$$= 2HP_d - HP_d = HP_d$$

as it must.

From the above it is seen that the correction to $HP_r$ for a given change of $HP_q$ is greater than for the equation in which the slave's position in the train was not taken into account.

A more rigorous development of the equation for $HP_r$ in terms of basic physical equations is given below. Assume rolling resistance of the train or any portion thereof is proportional to its weight, and the train is stretched so that there is no slack between any of the cars. The basic physical equations involved are $$F = \frac{W}{g}a$$

where F is force, $W/g$ is mass, and $a$ is acceleration, and $$HP = KSF$$

where K is a constant, S is velocity in miles per hour, and F is force in pounds.

For a balance of forces on the cars between the lead and slave locomotives $$F_L - F_F - R_1 = \frac{W_1}{g}a$$

Where $F_L$ is force on the drawbar of the lead locomotive and is (+) for tension, $F_F$ is the force on the front coupler of the slave locomotive and is (+) for tension and $R_1$ is the rolling resistance of the portion of the train between the lead and the slave locomotive.

For a balance of forces on the cars behind the slave locomotive $$F_q - R_2 = \frac{W_2}{g}a$$

Where $F_q$ is force on the rear coupler of the slave locomotive and is (+) for compression $R_2$ is the rolling resistance of the portion of the train behind the slave locomotive and $W_2$ is the weight of the portion of the train behind the slave locomotive. Since the acceleration of all parts of the train must be the same $$(F_L - F_F - R_1)\frac{g}{W_2} = (F_q - R_2)\frac{g}{W_2}$$

$$F_L - F_F - R_2 = \frac{W}{W_2}(F_r - R_2)$$

$$F_L - F_F - R_2 = \frac{W_1}{W_2}F_r - \frac{W_1}{W_2}R_2$$

Now $$\frac{R_1}{W_2} = \frac{R_2}{W_2} \text{ or } R_1 = \frac{W_1 R_2}{W_2}$$

$$F_L - F_F = \frac{W_1}{W_2}F_r$$

To convert from force to horsepower $$KS(F_L + F_F) = \frac{W_1}{W_2}KSF_q$$

$$HP_L - HP_F = \frac{W_1}{W_2}HP_q$$

If the force is measured on the front coupler of the slave locomotive the rear coupler horsepower can be written in terms of the front coupler horsepower and the horsepower being developed on the slave locomotive from $$-HP_F + HP_q = HP_d$$

$$HP_L - HP_F = \frac{W_1}{W_2}(+HP_F + HP_d)$$

$$HP_L = HP_F + \frac{W_1}{W_2}HP_F + \frac{W_1}{W_2}HP_d =$$

$$\frac{+W_2HP_F + W_1HP_F + W_1HP_d}{W_2}$$

Therefore, since $W_1 = W - W_2$ $$HP_L = \frac{+W_2HP_F + (W-W_2)HP_F + (W-W_2)HP_d}{W_2}$$

where W is the weight of the entire train.
Simplifying $$HP_L = \frac{+WHP_F + WHP_d - W_2HP_d}{W_2}$$

$$HP_L = +\frac{W}{W_2}HP_F + \left(\frac{W}{W_2} - 1\right)HP_d$$

It is desired that slave locomotive duplicate the operation of the lead locomotive. If the slave and lead locomotive are of equal horsepower and $HP_R$=slave horsepower to duplicate the lead locomotive.

$$HP_L = +\frac{W}{W_2}HP_F + \left(\frac{W}{W_2} - 1\right)HP_d$$

If slave and lead locomotives are of different horsepowers, then the slave locomotive should duplicate whatever fraction the slave locomotive horsepower is of the horsepower of the lead locomotive.

$HP_s$=rated horsepower of slave and $HP_H$=rated horsepower of lead locomotive then $$HP_R = \frac{HP_s}{HP_H} \cdot \frac{W}{W_2}HP_F + \left(\frac{W}{W_2} - 1\right)HP_d$$

and is true when $HP_s + HP_H$ as well as when $HP_s = HP_H$.

Referring to FIG. 8 which illustrates the embodiment of the invention wherein the force is sensed on the rear coupler of the slave locomotive, a train is generally referred to at 270 having a head or lead locomotive 271 and a helper or slave locomotive 272. Coupled between the mai nlocomotive 271 and the slave locomotive 272 are a plurality of cars referred to as 1A through 8A respectively. Coupled to the rear of the slave locomotive 272 are a plurality of cars referred to as 1B through 4B respectively. For the purposes of clarity of description, each of the cars 1A through 8A and 1B through 4B are assumed to be of approximately the same weight. Thus, one third of the entire train load is coupled to the rear of the helper locomotive and two thirds of the entire train load is coupled between the slave locomotive and the head or main locomotive. As in the previous embodiments, strain gauge apparatus referred to at 273 provides an analog signal proportional to the type and degree sensed by the strain gauge. A frequency generator 274 provides a voltage output which corresponds to the speed of the slave locomotive. The output of the frequency generator 274 is averaged by an averager 275 and the output therefrom is multiplied by the output from the strain gauge 273, by a multiplier 276. The output from the multiplier 276 is a voltage analog corresponding to an equivalent horsepower at the rear coupler of the slave locomotive 272. This voltage analog is amplified by an amplifier 277, the output of which is connected to a potentiometer 281 and through arm 280 to an adding device 282. Reverse direction detector 279 provides for reversing the effect of tension and compression on the operation of the slave locomotive, when the slave locomotive is detected traveling in a reverse direction. The voltage and current from the main generator 279 as in the previously described embodiments are multiplied by multiplier 283 to provide a voltage output corresponding to the horsepower develeoped by the slave locomotive under power conditions. Also, as in the previously described embodiment the dynamic braking traction armatures 284 provides a voltage and current output under dynamic braking condition which are multiplied by the multiplier 284B, the output of which produces a voltage analog corresponding to the braking horsepower developed. The output from the multiplier 284B is connected through an inverter 285 so that the voltage analog of the multiplier 283 under power conditions and the multiplier 284B under braking horsepower conditions wil be 180 degrees out of phase. These two voltage analogs corresponding to the horsepower developed under power conditions and the horsepower developed under dynamic braking conditions are connected to the input of the adder 282. These outputs are isolated so that when the slave locomotive is under power conditions there is no effective output from the multiplier 284B and when it is under the condition of dynamic braking there is no effective output from the multiplier 283. The adding device 282 combines the amplified output corresponding to the equivalent horsepower and either the voltage analog corresponding to the power or braking horsepower developed on the slave locomotive to provide a voltage analog corresponding to the horsepower required of the slave locomotive. A torque motor similar to those previously described operates to position a stepping switch 287 to control selectively the throttle setting and degree of dynamic braking of the locomotive control apparatus. The amplifier 277, amplifies the force signal to be greater than 1, and the potentiometer 281 provides the corrective factor which is a ratio of the position of the slave locomotive relative to its own proportionate share of the load which permits the slave locomotive to have all of its load or more or less than its proportionate share of the load behind it, and the potentiometer 281 also governs the operation of the slave locomotive to provide its proportionate share of the load during acceleration.

The following mathematical explanation is given for further understanding of the principles in the embodiment of FIG. 8 using an equivalent horsepower value at the rear coupling together with a developed horsepower on the locomotive to provide a signal corresponding to the horsepower required of the slave locomotive.

If the sensor is on the rear coupler of the slave locomotive, as shown in FIG. 8, and it is desired that the slave locomotive pull only those cars which are behind it, then the equation for the steady state operation is $HP_r = HP_q$. It is seen here that if the lead locomotive increases power, some of that increase in power will be used in pulling cars 1B, 2B, 3B and 4B at a higher rate of speed than the previous steady state condition. Thus $HP_q$ increases. The increase in $HP_q$ indicates an increase in the required horsepower and the control system will then increase horsepower on the slave locomotive.

If it is desired that the slave locomotive provide power for cars 8A and 7A as well as the cars 1B, 2B, 3B and 4B, then the equation for the required horsepower is $HP_r = (W_2 + X/W_2) \cdot HP_q \cdot (W_2 + X)/W_2$ is a ratio of the total train weight assigned to the slave locomotive divided by the weight of that portion of the train behind the slave locomotive. In the illustration of FIG. 8 the equation merely says that ⅔ of the power being developed by the slave locomotive should go into the rear coupler under steady state conditions.

From an examination of FIG. 8, it is seen that if the head locomotive increases horsepower from a steady state condition, and assuming that the train is stretched, ⅔ of the change in horsepower from the previous steady state is absorbed in the acceleration of the first 8 cars and ⅓ of the increased horsepower is absorbed in the acceleration of the last 4 cars, 1B through 4B. Since it is the force causing the acceleration of these last 4 cars, which appears at the rear coupler as a change from its previous steady state condition, it is only this value that will be used to indicate the increased requirement for horsepower on the slave locomotive. It is easily seen, however, that this force change, which has appeared at the rear coupler of the slave locomotive, is only ⅓ of the force change being initiated by the head locomotive. However, the force change initiated by the head locomotive can be obtained by taking the force change which has appeared at the rear coupler of the slave locomotive and multiplying it by the inverse of the fraction of the total train which is behind the slave locomotive. In other words, multiplying the force change at the rear coupler of the slave locomotive by the train weight ratio previously defined. If we now rewrite the previous equation for the conditions under consideration, that is $HP_r = HP_q$, in the form of $HP_r = HP_d - HP_d + HP_q$, we see that the $-HP_d + HP_q$ is the change from the steady state condition. If we multiply these last two terms, that is, $-HP_d + HP_q$ by our train weight ratio, we see that the change portion of this equation now is the same as that which has been initiated by the lead locomotive. Thus $HP_r = HP_d + R(HP_q - HP_d)$.

In short, the revision of the equation allows us to determine what the lead locomotive has done and can cause the slave locomotive to react accordingly.

In the case of the sensor on the rear coupler as shown in FIG. 8 and where the slave locomotive total train includes cars 7A and 8A the steady state condition can be written.

$$HH_r = HP_d + \left(HP_q - \frac{W_2}{W_2 + X}HP_d\right)$$

where the term in parenthesis is zero for steady state. If this term is other than zero it represents a change from the steady state and is the amount of force being used to accelerate the $W_2$ portion of the train. As pointed out previously this force is the fraction $W_{2/W}$ of the acceleration force being delivered by the lead locomotive. Thus we can multiply the term in parenthesis by $W/W_2 = R$ to determine the force (or horsepower) increase required of the slave locomotive to duplicate the force (or horsepower) change of the lead locomotive. This results in $$HP_r = HP_d + RHP_q - R\frac{W_2}{W_2 + X}HP_d$$

now $$\frac{W_2}{W_2 + X} = \frac{W_2}{W/2} = \frac{2W_2}{W} = \frac{2}{R}$$

Hence $$HP_r = HP_d + RHP_q - R \cdot \frac{2}{R} \cdot HP_d$$

$$= HP_d + RHP_q$$

A more rigorous development of the above equation from basic physical equations follows.

When the force is sensed on the rear coupler of the slave locomotive from $$HP_L - HP_F = \frac{W_1}{W_2}HP_q$$

developed previously and $-HP_F + HP_q = HP_d$ as previously shown then $$HP_L = \frac{W_1}{W_2}HP_q + HP_q - HP_d$$

$$= \frac{W_1 HP_q + W_2 HP_q - W_2 HP_d}{W_2}$$

$$= \frac{W_2 HP_q + - W_2 HP_d}{W_2}$$

or, since $W = W_{1t}W_2$ $$HP_L = \frac{W_1}{W_2}HP_q - HP_d$$

When the rated horsepower of the lead and slave locomotive are equal, then, since we want the slave locomotive to duplicate the action of the lead locomotive $$HP_R = \frac{W}{W_2}HP_q - HP_d$$

For unequal slave and lead rated horsepower $$HP_R = \frac{HP_S}{HP_H}\left(\frac{W}{W_2}HP_q - HP_d\right)$$

According to FIG. 8, if lead locomotive is pushing train and sensor is on rear coupler of the slave $$(F_L - F_F) = \frac{W_1}{g}a \text{ Compression on front coupler is } +$$

$$F_q = \frac{W_2}{g}a \text{ Compression on rear coupler is } +$$

Since acceleration of the entire train is the same $$(F_L - F_F)\frac{g}{W_1} = (F_q)\frac{g}{W_2}$$

$$F_L - F_F = \frac{W_1}{W_2}F_q$$

$$KSF_L - KSF_F = \frac{W_1}{W_2}KSF_q$$

$$HP_L = HP_F + \frac{W_1}{W_2}HP_q$$

For this case $$HP_d = HP_q - HP_F$$

$$HP_L = \frac{W_1}{W_2}HP_q + HP_q - HP_d$$

$$= \frac{W_1 HP_q + W_2 HP_q - W_2 HP_d}{W_2}$$

$$= \frac{W}{W_2}HP_q - HP_d$$

This is the same equation as that under conditions where the train is being pulled. It should be noted that in the case of the train being pushed that a (+) sign was assigned to compression on the rear coupler. This sign is opposite to that for the case of the train being pulled.

From the above it is seen that the same equation for required horsepower of the slave locomotive holds if the force sensor output leads are reversed if the train is being pushed when being operated in the normal manner with the lead locomotive pulling the train.

Referring to FIG. 9, a system is illustrated using magnetic amplifiers to provide the calculations for a specific embodiment which may be used to control a slave locomotive with strain gauge 300 located on the rear coupler and employing a corrective factor corresponding to the train weight ratio R. The output from the strain gauge 300 is conducted through a full wave rectifier 301 and a variable resistor 302 to an amplifier 303. The output from the amplifier 303 is pulsed wave D.C. voltage which may be filtered by a filter 304 so that the system is not affected by the phase. The output from the filter 304 is connected to a magnetic amplifier modulator 305 which changes the D.C. input to an A.C. wave, the phase of which depends on the polarity, and the amplitude of which is proportional to the D.C. input. As the input to the modulator 305 changes the amplitude of the A.C. output on wire 306 changes. Thus, the force sensed by the strain gauge is an A.C. voltage on wire 306, the amplitude of which is proportional to the degree and the phase to the type of force.

A frequency generator 307 provides an output, the frequency of which corresponds to the speed of the slave locomotive, which is amplified and rectified by device 308 to provide a D.C. voltage which is proportional to the speed. This D.C. voltage is filtered by a filter 310 to provide a D.C. analog voltage which varies with the speed. The A.C. analog voltage on wire 306 and the analog voltage on wire 311 is multiplied by a magnetic amplifier 312 to provide an A.C. output on wire 313 corresponding to the horsepower equivalent at the rear coupling. This horsepower equivalent analog voltage is connected to magnetic demodulator 314 to demodulate the A.C. input to a D.C. voltage analog. This D.C. voltage analog is amplified by amplifier 315, the output of which is connected over wires 315a and 315b to an adjustable T pad 316. The output of the T pad provides an equivalent horsepower analog voltage which is adjustably modified in accordance with the weight factor ratio which corresponds to the relative position of the slave locomotive in the train.

The voltage and current from the main generator is taken from wires 317 and multiplied by a multiplier 320 which may be a so-called Hall effect device to provide an analog of the developed horsepower under power conditions.

The grid voltage and current is taken from the dynamic braking traction armature over wires 322. The D.C. voltage output is modulated by magnetic amplifier 324 to provide an A.C. voltage on wire 325. This A.C. voltage on output 325 and the D.C. voltage output on wire 326 is multiplied by the multiplier 327 to provide an A.C. voltage corresponding to the developed horsepower under dynamic braking conditions at output 328. This analog voltage is demodulated by demodulator 330 to have a D.C. voltage analog corresponding to the braking horsepower of the slave locomotive.

A comparator 332, which may be a magnetic amplifying device has an input voltage on coil 333 corresponding to the equivalent horsepower at the coupling multiplied by the train weight factor from the output of the adjustable T pad 316; an input from the multiplier 320 corresponding to the horsepower developed on the slave locomotive under power conditions; and an input from demodulator 330 corresponding to the horsepower developed on the slave locomotive under dynamic braking conditions. When there is an input from multiplier 320, there is no input from the demodulator 330. Thus under power conditions, the output from the comparator 332 is a voltage analog corresponding to the horsepower required of the slave locomotive for setting the throttle or brakes of the slave locomotive as the case may be. The variable resistors 302, 335, 336, 337, 338, 339 and 340 are scaling resistors. The T pad which keeps a constant impedance, but changes its ouput voltage relative to the input voltage is adjustable in accordance with the proportion of the train load for which the slave locomotive is to provide the power in accordance with the train weight ratio.

In summary, the amount of tension or compression to which the helper or slave locomotive is subjected is measured to provide an analog voltage in accordance therewith. The system detects the direction of travel, calculates the speed of the locomotive, the tractive effort being developed by the locomotive, or the horsepower developed on the locomotive, and provides analogs of voltage corresponding thereto. These various analogs of voltage are then used to obtain the required horsepower of the helper locomotive for operating the locomotive to bring the strain to which it is subjected to within predetermined limits consistent with the load it is sharing with the main or lead locomotive. The system may be used to control the train so that it is constantly attempting to bring this force in tension or compression to substantially zero or it may be used for maintaining a proportionate force at the coupling in either tension or compression according to the requirements of practice. The system employs dynamic braking as negative tractive effort and is so organized to change from power to dynamic braking with no difficulty. The horsepower required of the helper locomotive may either be used to control the locomotive motors directly or it may merely control an indicator for selectively indicating to an operator of the helper locomotive the throttle setting which he should manually make in accordance with the strain or force which is at the draw-bar or coupling. It is understood that electronic apparatus for performing the same functions as the positioning units of FIGS. 1A, 1B, 1C and 3 may be substituted in whole or in part for the positioning unit to obtain the desired results. Also, that although magnetic amplifiers, multipliers, modulators and demodulator have been illustrated and described in connection with FIG. 9 other electronic apparatus may be used to provide a similar function.

Although the terms front and rear coupler are used in describing the particular coupler to which the slave locomotive's load is connected, the train may be operated in a reverse direction to push its load coupled to the so-called rear coupler by reversing the effect of the force in tension and compression on the system. Thus, by the term front coupler or draw-bar is meant the force at the same end of the slave locomotive to which the load of the main or lead locomotive is connection, and the term rear coupler as being the end of the slave locomotive opposite the end to which the load of the main or lead locomotive is connected. It is to be understood that with the benefit of the present invention it is possible to include more than one slave locomotive within a train. For example if four locomotives are required to haul a certain load, the main locomotive may be placed at the head end and the three slaves at the 25%, 50% and 75% points respectively. Although the rolling resistance of the cars of the train has been described as a weight factor, it is understood that cars of different characteristics may operate differently with similar loads or the same with a different load, and the term weight factor is meant to include the resistance of the car to pulling or pushing.

It is also understood that arrangements and combinations of the various analogs of force, velocity, and developed power on the slave locomotive may be combined in other ways to provide an analog signal, which governs the slave locomotive in accordance with the present invention. For example, in providing a corrective factor so that the horsepower required analog is computed includes the horsepower required to accelerate its portion of the train when the force is sensed on the front coupling it may be accomplished by correcting on the force value instead of the horsepower equivalent value. As another example, by using a differently defined train weight ratio, the various computations to provide the required horsepower when the force is sensed on either the front or rear coupler may differ from the illustrated embodiment.

Having thus described the method and system according to specific embodiments of the invention together with a description of its operation under various conditions, it should be understood that the specific apparatus and circuits used herein are not in any manner intended to limit the scope of the invention; and that other modifications and adaptations may be made without departing from the spirit or scope of the present invention.

What I claim is:

1. A method of controlling a train of railroad cars powered by two remotely spaced locomotives, one of which serves as a control locomotive and the other of which serves as a helper locomotive, comprising measuring the force to which said helper locomotive is subjected because of the operation of the main locomotive, utilizing a result of said measurement of force to obtain a signal characteristic of power required of the helper locomotive, and modifying the signal in accordance with selection of a predetermined portion of the train load which the helper locomotive should assume, irrespective of its position in the train.

2. A method of controlling a train of railroad cars by two remotely spaced locomotives, one of which serves as a control locomotive and the other of which serves as a helper locomotive, comprising measuring the force to which the helper locomotive is subjected when the train is pulled by the control locomotive, utilizing a result of said measurement together with a signal indicative of the speed of the train for obtaining measurement of equivalent horsepower at a coupler of the helper locomotive, measuring the horsepower developed by the helper locomotive, comparing the equivalent horsepower with the developed horsepower to obtain the horsepower required of the helper locomotive varying the measured force so that the helper locomotive is assuming a predetermined portion of the train load irrespective of the position of the helper locomotive in the train, and operating selectively the throttle and brakes of the helper locomotive in accordance with the horsepower required.

3. A system for controlling a helper locomotive connected to a train of cars with a main locomotive, comprising force detection means effective to detect the force to which the helper locomotive is subjected because of the operation of the main locomotive, speed detection means effective to detect the speed that the helper locomotive is traveling, means effective to detect the horsepower developed by the helper locomotive, means including the horsepower developed detecting means and responsive to the degree of force detected by the force detecting means and the speed detected by the speed detecting means to determine horsepower that is required of the helper locomotive to govern the locomotive to be operated to vary the force sufficient that the helper locomotive is pulling a predetermined portion of the train load other than all of the load in the portion of the train to the rear of the helper locomotive.

4. A system for controlling a helper locomotive adapted to be connected in a train of cars with a main locomotive, comprising means effective to produce a first electrical signal related to a tensile force exerted upon the helper locomotive as a result of tensile forces applied to the train by the main locomotive, means effective to produce a second electrical signal corresponding to the horsepower developed by the helper locomotive, means effective to produce a third electrical signal corresponding to the speed of the locomotive, computing means governed by said first and second and third signals to produce an electrical signal corresponding to the horsepower required of the helper locomotive, and means governed by the horsepower required signal to select the proper control for operating the helper locomotive to share with the main locomotive a predetermined portion of the train load.

5. A system as claimed in claim 4 wherein said computing means includes means effective to divide said second electrical signal by said third electrial signal to obtain a fourth electrical signal corresponding to the torque developed by the helper locomotive, and includes means effective to add said fourth electrical signal to said first electrical signal to obtain a fifth electrical signal corresponding to the torque required of the helper locomotive, and includes means effective to multiply said fifth electrical signal by said third electrical signal to obtain said required horsepower.

6. A system as claimed in claim 4 wherein said computing means includes means effective to multiply said first electrical signal by said third electrical signal to obtain a fourth electrical signal corresponding to an equivalent horsepower, and includes means effective to add said fourth electrical signal to said second electrical signal to obtain an electrical signal corresponding to the horsepower required.

7. A system as claimed in claim 4 wherein said means for producing said second electrical signal includes means for causing at times said second electrical signal to correspond to the braking horsepower of the helper locomotive.

8. A system as claimed in claim 4 comprising means responsive to said third electrical signal effective to cause said selection means to select a control for operating the helper locomotive when the helper locomotive is traveling below a predetermined speed irrespective of a higher speed selection as controlled by said computing means.

9. A system as claimed in claim 4 wherein said means for producing the first electrical signal includes means effective to cause said electrical signal to be identical for a reverse direction of the helper locomotive when it is subjected to a pushing force as said electrical signal for the forward direction when the helper locomotive is subjected to a pulling force.

10. A system as claimed in claim 4 comprising circuit means effective to select an idling control of the locomotive motors in response to the application of the brakes of the main locomotive.

11. A system as claimed in claim 4 wherein said selection means is an indicator effective to indicate the proper throttle and brake setting of the locomotive control apparatus in accordance with the electrical signal corresponding to the horsepower required.

12. A system as claimed in claim 4 wherein said selection means is an apparatus for automatically controlling the throttle setting and brake controls of the helper locomotive in response to the electrical signal corresponding to the horsepower required.

13. A control system for operating a helper locomotive that is adapted to be connected in a train with a main locomotive, comprising strain detection means operatively connected to said train for detecting the force exerted against said helper locomotive by said main locomotive, means effective to provide an output voltage of one polarity for a tensile force and an opposite polarity for a compressive force, a speed detection means effective to detect the speed of said helper locomotive for producing an output voltage corresponding to said speed, means effective to produce an output voltage corresponding to horsepower developed by said helper locomotive, and combining circuit means effective to operatively combine said speed voltage with said force voltage of either polarity and said horsepower developed output voltage for producing an output voltage corresponding to the horsepower that is required of the helper locomotive to cause said helper locomotive to vary the force to that required for the helper locomotive to pull a predetermined portion of the train load.

14. A system as claimed in claim 13 wherein said combining circuit means includes means effective to produce an output voltage corresponding to the tractive effort of said helper locomotive and means responsive to the tractive effort voltage and said force voltage of either polarity to obtain an output voltage corresponding to the torque required, and includes multiplying means effective to multiply the speed output voltage by the torque required output voltage to obtain the output voltage corresponding to the horsepower required.

15. A system as claimed in claim 13 wherein said combining circuit means includes means effective to multiply said force voltage of either polarity with said speed output voltage to obtain an output voltage corresponding to an equivalent horsepower at the point of the detected strain of the helper locomotive, and includes means for adding said equivalent horsepower output voltage to said developed horsepower output voltage to obtain an output voltage corresponding to the horsepower required.

16. A system as claimed in claim 13 comprising means controlled by the voltage and current in the motors of the helper locomotive effective to obtain an output voltage corresponding to the braking horsepower developed by the helper locomotive, and means effective to selectively connect said horsepower developed voltage and said braking horsepower developed voltage to said combining circuit means.

17. A system for governing the operation of a helper locomotive connected in a train of cars with a main locomotive such that a first portion of the train load is coupled between the helper locomotive and the main locomotive and a second portion is coupled to the rear of the helper locomotive, comprising means responsive to the tensile and compressive force exerted against the helper locomotive by reason of the operation of the main locomotive to produce a first electrical signal characteristic of the detected force, means to produce a second electrical signal characteristic of the speed of the train, means to combine the first and second electrical signals to produce a signal corresponding to the equivalent horsepower at the point of the detected force, means to apply a corrective factor to the equivalent horsepower signal, the value of said corrective factor being determined by the relative weight of the first and second portions of the train and the portion of the entire train for which the helper locomotive is to provide the power, and means to govern the operation of the helper locomotive to pull a predetermined portion of the train load as governed by a signal corresponding to the product of the corrective factor and equivalent horsepower signal.

18. A system for governing the operation of a helper locomotive connected in a train of cars with a main locomotive such that a portion of the train load is coupled between the helper locomotive and the main locomotive and another portion is coupled to the rear of the helper locomotive, comprising means for obtaining a first signal which is variable responsive to the force exerted through a coupling of the helper locomotive by the main locomotive, means to produce a second electrical signal characteristic of the speed of the train, means to combine the first and second signals, means adjustable in accordance with the relative position of the helper locomotive in the train to modify the combined first and second signals to produce a third electrical signal, means to produce a fourth electrical signal representative of an energy factor corresponding to an operating condition of the helper locomotive, means to combine the third and fourth signals to produce a fifth electrical signal to govern the operation of the helper locomotive to provide the effort to move the predetermined portion of the entire train as governed by the adjustable means.

19. A system for governing the operation of a helper locomotive connected in a train of cars with a main locomotive such that a portion of the train load is coupled between the helper locomotive and the main locomotive and another portion is coupled to the rear of the helper locomotive, comprising means to produce a first electrical signal corresponding to a force exerted in a coupling connection of the helper locomotive by the main locomotive, means adjustable in accordance with the portion of the train coupled to the said connection to modify said first signal, means to produce a second electrical signal corresponding to the force developed by the helper locomotive, and means to combine the modified first signal and the second signal to govern the operation of the helper locomotive to provide the power for a predetermined portion of the train load as governed by the adjustable means.

20. A method of controlling a helper locomotive that is connected in a train of cars with a main locomotive such that a first portion of the entire train is coupled between the helper locomotive and the main locomotive and a second portion is coupled to the rear of the helper locomotive comprising, measuring a horsepower equivalent at a particular one of the coupling connections of the helper locomotive in the train, said equivalent horsepower being variable in accordance with the speed of the train and a force exerted through that coupling upon the helper locomotive by the main locomotive, measuring the horsepower developed on the helper locomotive, multiplying the horsepower equivalent with a train weight ratio factor corresponding to the relative weight of the first and second portion of the train, and comparing the product of the horsepower equivalent and train weight ratio factor with the developed horsepower to obtain the horsepower required of the helper locomotive to pull a predetermined portion of the train.

21. A system for governing the operation of a helper locomotive connected in a train of cars with a main locomotive such that a first portion of the entire train is coupled between the helper locomotive and the main locomotive and a second portion is coupled to the rear of the helper locomotive, comprising means responsive to the detection of a force exerted upon the helper locomotive by the main locomotive through couplings of the first portion of the train to produce a first characteristic electrical signal, means responsive to the velocity of the train to produce a second characteristic signal, means to combine said first and second electrical signal to produce a third electrical signal corresponding to an equivalent horsepower at the point of detection of the force, means to produce a fourth electrical signal corresponding to a ratio of the relative weight of the first and second portions and a predetermined portion of the entire train for which the helper locomotive is to provide the power, means to combine the third and fourth electrical signals to produce a fifth electrical signal, means to produce a sixth electrical signal corresponding to the horsepower developed by the helper locomotive, means to combine the fifth and sixth electrical signals to obtain a seventh electrical signal corresponding to the horsepower required of the helper locomotive to provide the power for the predetermined portion of the train load, means governed by the horsepower required signal to vary the fourth electrical signal and to govern the operation of the helper locomotive.

22. A system for governing the operation of a helper locomotive connected in a train of cars with a main locomotive such that a first portion of the entire train is coupled between the helper locomotive and the main locomotive and a second portion is coupled to the rear of the helper locomotive comprising, means responsive to the detection of a force exerted upon the helper locomotive by the main locomotive through couplings of the first portion of the train to produce a first characteristic electrical signal, means responsive to the velocity of the train to produce a second characteristic signal, means to combine said first and second electrical signal to produce a third electrical signal corresponding to an equivalent horsepower at the point of detection of the force, means to produce a fourth electrical signal corresponding to the horsepower developed on the helper locomotive, means to combine the fourth electrical signal with third electrical signal algebraically to obtain a fifth electrical signal, adjustable means to modify the fifth electrical signal in accordance with a train weight ratio factor corresponding to the weight of the entire train to the portion of the train behind the helper locomotive, means to combine the modified fifth electrical signal with the fourth electrical signal to obtain a signal corresponding to the horsepower required of the helper locomotive to share a predetermined portion of the train load.

23. A system for governing the operation of a helper locomotive connected in a train of cars with a main locomotive such that a first portion of the entire train is coupled between the helper locomotive and the main locomotive and a second portion is coupled to the rear of the helper locomotive, comprising means responsive to the force exerted by the main locomotive through the couplings of the first portion of the train upon the helper locomotive at its point of coupling to the portion of the train coupled to the rear of the helper locomotive to produce a first electrical signal characteristic of the type and degree of the force, means responsive to the velocity of the helper locomotive to produce a second electrical signal, means to combine the first and second electrical signals to obtain a third electrical signal corresponding to an equivalent horsepower at the point of detection of the force, means adjustable in accordance with the relative weights of the first and second portions of the train and the portion of the train for which the helper locomotive is to provide the power to modify the third electrical signal in accordance therewith, means to produce a fourth electrical signal corresponding to the horsepower developed by the helper locomotive, means to algebraically add the modified third and fourth electrical signals to obtain a fifth electrical signal to selectively govern the operation of the helper locomotive to pull the predetermined portion of the train load.

24. A system as claimed in claim 23 further including means to reverse the characteristics of the first signal in response to a change from a tensile to a compressive force exerted at said point of coupling pulling force when the train is detected operating in a reverse direction.

25. In a system for governing a helper locomotive at an intermediate point in a train to accelerate a first predetermined portion of a train load in response to the acceleration of a second portion of the train load by a lead locomotive at the head of the train, means for generating a first signal in response to detection of a force on the rear coupler of the helper locomotive having a component indicative of accelerating force exerted by the lead locomotive, means to produce a second electrical signal corresponding to a force developed by the helper locomotive, means to modify the effect of the force factor on the second electrical signal in accordance with the relative weight of the first and second train load portions, and means to combine the first signal with the modified second signal to produce a signal corresponding to a force required of the helper locomotive to assume its share of the load in the acceleration of the train.

References Cited by the Examiner

UNITED STATES PATENTS

| | | | |
|---|---|---|---|
| 1,236,778 | 8/1917 | Simmon et al. | 318—100 |
| 2,285,580 | 6/1942 | Hanson | 265—1 |
| 2,813,709 | 11/1957 | Brier | 323—75 |
| 3,035,653 | 5/1962 | Steepe | 180—14 |
| 3,100,546 | 8/1963 | Cramwinckel | 323—75 X |

ARTHUR L. LA POINT, *Primary Examiner.*

LEO QUACKENBUSH, *Examiner.*